United States Patent
Zhang et al.

(10) Patent No.: US 9,883,485 B2
(45) Date of Patent: Jan. 30, 2018

(54) EVOLVED MULTIMEDIA BROADCAST MULTICAST SERVICE ON ENHANCED COMPONENT CARRIERS

(71) Applicant: QUALCOMM Incorporated, San Diego, CA (US)

(72) Inventors: Xiaoxia Zhang, San Diego, CA (US); Jun Wang, Poway, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 14/973,300

(22) Filed: Dec. 17, 2015

(65) Prior Publication Data
US 2016/0205664 A1    Jul. 14, 2016

Related U.S. Application Data

(60) Provisional application No. 62/101,226, filed on Jan. 8, 2015.

(51) Int. Cl.
*H04W 72/00* (2009.01)
*H04L 5/00* (2006.01)
(Continued)

(52) U.S. Cl.
CPC ............. *H04W 72/005* (2013.01); *H04L 5/00* (2013.01); *H04L 5/0048* (2013.01); *H04W 4/06* (2013.01);
(Continued)

(58) Field of Classification Search
CPC ........... H04W 72/005; H04W 72/0446; H04W 72/0453; H04W 4/06; H04L 5/0048; H04L 5/00
See application file for complete search history.

(56) References Cited

U.S. PATENT DOCUMENTS

| | | | |
|---|---|---|---|
| 2005/0175115 A1* | 8/2005 | Walton | H04B 7/0417 375/267 |
| 2009/0046617 A1* | 2/2009 | Tenny | H04L 5/0064 370/312 |

(Continued)

FOREIGN PATENT DOCUMENTS

| | | |
|---|---|---|
| EP | 2276276 A2 | 1/2011 |
| WO | WO-2011044290 A1 | 4/2011 |

OTHER PUBLICATIONS

ISA/EPO, International Search Report and Written Opinion of the International Searching Authority, Int'l App. No. PCT/US2016/012380, dated Mar. 24, 2016, European Patent Office, Rijswijk, NL, 12 pgs.

(Continued)

*Primary Examiner* — Christine Ng
(74) *Attorney, Agent, or Firm* — Holland & Hart LLP

(57) ABSTRACT

Methods, systems, and devices are described for evolved multimedia broadcast multicast service (eMBMS) utilizing enhanced component carriers (eCCs). A wireless system may send unicast data using resources allocated for multicast transmissions (e.g., eMBMS transmissions). The presence of unicast data in a transmission time interval (TTI) scheduled for multicast transmission may be indicated by a control region within the TTI. A UE may monitor the control region to identify the presence of unicast information. A TTI scheduled for multicast transmission may also include reference signals to aid in the demodulation of multicast or unicast data. In some cases, the reference signals may be front-loaded at the beginning or embedded within the TTI. The embedded reference signals may be configured based on the type of data carried by the TTI scheduled for multicast transmission, or by length of the cyclic prefix used by the TTI scheduled for multicast transmission.

26 Claims, 20 Drawing Sheets

(51) Int. Cl.
*H04W 72/04* (2009.01)
*H04W 4/06* (2009.01)

(52) U.S. Cl.
CPC ... *H04W 72/0446* (2013.01); *H04W 72/0453* (2013.01)

(56) References Cited

U.S. PATENT DOCUMENTS

| | | | | |
|---|---|---|---|---|
| 2010/0034191 | A1* | 2/2010 | Schulz | G01D 21/00 370/350 |
| 2011/0255450 | A1* | 10/2011 | Wang | H04W 72/0493 370/280 |
| 2012/0110410 | A1* | 5/2012 | Chilappagari | H04L 1/007 714/756 |
| 2012/0213141 | A1 | 8/2012 | Damnjanovic | |
| 2013/0010603 | A1* | 1/2013 | Richardson | H04W 74/0875 370/241 |
| 2013/0265955 | A1* | 10/2013 | Kim | H04W 72/04 370/329 |
| 2014/0153471 | A1* | 6/2014 | Zhang | H04W 4/06 370/312 |
| 2014/0204777 | A1* | 7/2014 | Huang | H04W 36/28 370/252 |
| 2015/0009914 | A1* | 1/2015 | Chen | H04L 5/0073 370/329 |

OTHER PUBLICATIONS

Qualcomm Europe, "On Unicast Transmission in MBSFN Subframes," 3GPP TSG RAN WG1 #58bis, R1-094197, Miyazaki, Japan, Oct. 12-16, 2009, 2 pgs., 3rd Generation Partnership Project.

\* cited by examiner

EVOLVED MULTIMEDIA BROADCAST MULTICAST SERVICE ON ENHANCED COMPONENT CARRIERS

CROSS REFERENCES

The present Application for Patent claims priority to U.S. Provisional Patent Application No. 62/101,226 by Zhang et al., entitled "Evolved Multimedia Broadcast Multicast Service on Enhanced Component Carriers," filed Jan. 8, 2015, assigned to the assignee hereof, and expressly incorporated by reference herein.

BACKGROUND

Field of Disclosure

The following relates generally to wireless communication, and more specifically to evolved multimedia broadcast multicast service (eMBMS) on enhanced component carriers (eCCs).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Some wireless communication systems may be configured to transmit both multicast data (e.g., for an eMBMS) and unicast data. The wireless systems may reserve radio resources (e.g., time and frequency resources) for each transmission type. For instance, a portion of the system bandwidth may be allocated for unicast transmissions and a different portion of the system bandwidth may be allocated for a transmission time interval (TTI) scheduled for multicast transmissions. But in some cases, more resources may be reserved for multicast transmissions than are actually used by these transmissions. This may result in an inefficient use of radio resources.

SUMMARY

Systems, methods, and apparatuses for evolved multimedia broadcast multicast service (eMBMS) on enhanced component carriers (eCCs) are described. A wireless system may send unicast data using resources allocated for multicast transmissions. The presence of unicast data in a transmission time interval (TTI) scheduled for multicast transmission may be indicated by a control region within the TTI. A user equipment (UE) may monitor the control region to identify the presence of unicast information. A TTI scheduled for multicast transmission may also include reference signals to aid in the demodulation of multicast or unicast data. In some cases, the reference signals may be front-loaded at the beginning of the TTI or may be embedded within the TTI. The embedded reference signals may be configured based on the type of data carried by the TTI scheduled for multicast transmission, or by length of the cyclic prefix used by the TTI scheduled for multicast transmission.

A method of communication at a wireless device is described. The method may include determining that a set of resources is scheduled for an eMBMS, determining that a first symbol period of the set of resources is associated with a cell specific reference signal (CRS) preamble and a second symbol period of the set of resources is a unicast control symbol period, and identifying a control message in the unicast control symbol period indicating a unicast data transmission utilizing the set of resources.

An apparatus for communication at a wireless device is described. The apparatus may include means for determining that a set of resources is scheduled for an eMBMS, means for determining that a first symbol period of the set of resources is associated with a CRS preamble and a second symbol period of the set of resources is a unicast control symbol period, and means for identifying a control message in the unicast control symbol period indicating a unicast data transmission utilizing the set of resources.

A further apparatus for communication at a wireless device is described. The apparatus may include a processor, memory in electronic communication with the processor, and instructions stored in the memory. The instructions may be executable by the processor to cause the apparatus to determine that a set of resources is scheduled for an eMBMS, determine that a first symbol period of the set of resources is associated with a CRS preamble and a second symbol period of the set of resources is a unicast control symbol period, and identify a control message in the unicast control symbol period indicating a unicast data transmission utilizing the set of resources.

A non-transitory computer-readable medium storing code for communication at a wireless device is described. The code may include instructions executable to determine that a set of resources is scheduled for an eMBMS, determine that a first symbol period of the set of resources is associated with a CRS preamble and a second symbol period of the set of resources is a unicast control symbol period, and identify a control message in the unicast control symbol period indicating a unicast data transmission utilizing the set of resources.

Some examples of the method, apparatuses, or non-transitory computer-readable medium described above may further include processes, features, means, or instructions for performing a CRS on/off detection for a subframe associated with the set of resources, and receiving at least one CRS during the subframe based at least in part on the CRS on/off detection. Additionally or alternatively, some examples may include processes, features, means, or instructions for combining the at least one CRS with accumulated CRS data based at least in part on the CRS on/off detection.

Some examples of the method, apparatuses, or non-transitory computer-readable medium described above may further include processes, features, means, or instructions for receiving at least one demodulation reference signal (DMRS) during the subframe. Additionally or alternatively, in some examples, the at least one DMRS utilizes at least one resource element associated with a CRS pattern.

In some examples of the method, apparatuses, or non-transitory computer-readable medium described above, the at least one DMRS utilizes a low-density resource pattern for a set of non-CRS resource elements. Additionally or alternatively, some examples may include processes, features, means, or instructions for receiving the control message during the unicast control symbol period, and receiving the unicast data transmission during the subframe based at least in part on the control message.

Some examples of the method, apparatuses, or non-transitory computer-readable medium described above may further include processes, features, means, or instructions for transmitting the control message during the unicast control symbol period, and transmitting the unicast data transmission during the subframe. Additionally or alternatively, some examples may include processes, features, means, or instructions for determining that a second set of resources is scheduled for a second eMBMS.

Some examples of the method, apparatuses, or non-transitory computer-readable medium described above may further include processes, features, means, or instructions for determining that the set of resources and the second set of resources are multiplexed according to a frequency division multiplexing (FDM) configuration. Additionally or alternatively, some examples may include processes, features, means, or instructions for determining that the set of resources and the second set of resources are multiplexed according to a time division multiplexing (TDM) configuration.

Some examples of the method, apparatuses, or non-transitory computer-readable medium described above may further include processes, features, means, or instructions for receiving an eMBMS preemption indication, and determining that the set of resources scheduled for the eMBMS contains unicast data based at least in part on the preemption indication. Additionally or alternatively, in some examples, the set of resources are based at least in part on a reduced symbol period, and the reduced symbol period may correspond to an eCC configuration.

In some examples of the method, apparatuses, or non-transitory computer-readable medium described above, the reduced symbol period is equal to a clear channel assessment (CCA) length. Additionally or alternatively, in some examples, the reduced symbol period is based at least in part on an extended cyclic prefix (CP) length.

In some examples of the method, apparatuses, or non-transitory computer-readable medium described above, the reduced symbol period based at least in part on the extended CP length corresponds to a bandwidth range associated with the eMBMS and a second reduced symbol period based at least in part on a non-extended CP length corresponds to a bandwidth range associated with unicast transmission. Additionally or alternatively, in some examples the control message uses a physical uplink format indicator channel (PUFICH) format or resource assignment.

In some examples of the method, apparatuses, or non-transitory computer-readable medium described above, determining that the set of resources is scheduled for the eMBMS includes receiving a system information block (SIB) indicating the eMBMS and receiving a multicast control channel (MCCH) based at least in part on the SIB.

A method of communication at a wireless device is described. The method may include receiving a physical multicast control channel (PMCCH) transmission indicating a set of time and frequency resources for a physical multicast channel (PMCH), and receiving a physical multicast scheduling indicator channel (PMSICH) transmission indicating a set of time and frequency resources for a multicast traffic channel (MTCH) based at least in part on the PMCCH.

An apparatus for communication at a wireless device is described. The apparatus may include means for receiving a PMCCH transmission indicating a set of time and frequency resources for a PMCH, and means for receiving a PMSICH transmission indicating a set of time and frequency resources for an MTCH based at least in part on the PMCCH.

A further apparatus for communication at a wireless device is described. The apparatus may include a processor, memory in electronic communication with the processor, and instructions stored in the memory. The instructions may be executable by the processor to cause the apparatus to receive a PMCCH transmission indicating a set of time and frequency resources for a PMCH, and receive a PMSICH transmission indicating a set of time and frequency resources for an MTCH based at least in part on the PMCCH.

A non-transitory computer-readable medium storing code for communication at a wireless device is described. The code may include instructions executable to receive a PMCCH transmission indicating a set of time and frequency resources for a PMCH, and receive a PMSICH transmission indicating a set of time and frequency resources for an MTCH based at least in part on the PMCCH.

Some examples of the method, apparatuses, or non-transitory computer-readable medium described above may further include processes, features, means, or instructions for receiving a SIB indicating a set of resources for the PMCCH.

A method of communication at a wireless device is described. The method may include determining that a bandwidth range of an eCC is scheduled for eMBMS, selecting an extended CP length for the bandwidth range based at least in part on the determination, and selecting a reference signal configuration based at least in part on the extended CP length.

An apparatus for communication at a wireless device is described. The apparatus may include means for determining that a bandwidth range of an eCC is scheduled for eMBMS, means for selecting an extended CP length for the bandwidth range based at least in part on the determination, and means for selecting a reference signal configuration based at least in part on the extended CP length.

A further apparatus for communication at a wireless device is described. The apparatus may include a processor, memory in electronic communication with the processor, and instructions stored in the memory. The instructions may be executable by the processor to cause the apparatus to determine that a bandwidth range of an eCC is scheduled for eMBMS, select an extended CP length for the bandwidth range based at least in part on the determination, and select a reference signal configuration based at least in part on the extended CP length.

A non-transitory computer-readable medium storing code for communication at a wireless device is described. The code may include instructions executable to determine that a bandwidth range of an eCC is scheduled for eMBMS, select an extended CP length for the bandwidth range based at least in part on the determination, and select a reference signal configuration based at least in part on the extended CP length.

In some examples of the method, apparatuses, or non-transitory computer-readable medium described above, the reference signal configuration includes a minimum TTI length. Additionally or alternatively, in some examples the reference signal configuration includes an increased reference signal density.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
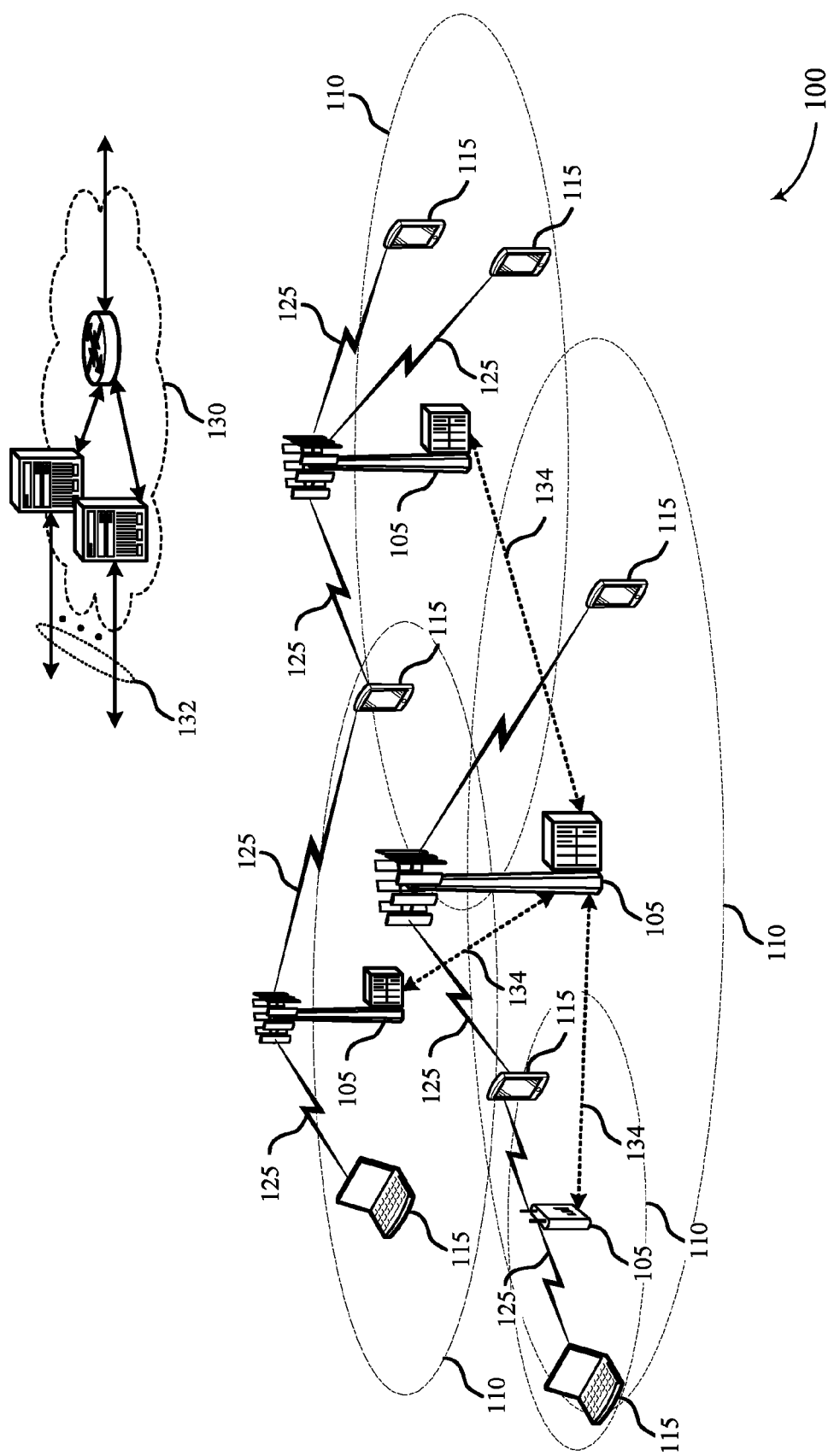
FIG. 1 illustrates an example of a wireless communications system for evolved multimedia broadcast multicast service (eMBMS) on enhanced component carriers (eCCs) in accordance with various aspects of the present disclosure.

In some wireless communication systems, a base station may transmit unicast data or multicast data. The base station may send unicast data using resources allocated for multicast transmissions. The presence of unicast data in a transmission time interval (TTI) scheduled for multicast transmission may be indicated by a control region within the TTI. A user equipment (UE) may monitor the control region to identify the presence of unicast information.

In some cases, there may be a surplus of time and frequency resources allocated for enhanced multimedia broadcast multicast service (eMBMS) (e.g., the eMBMS data may use a fraction, or none, of the reserved resources). If there is no eMBMS data available for transmission, or if unicast data has a higher priority than the eMBMS data, the radio resources allocated for a TTI scheduled for multicast transmissions may be used for unicast transmissions. In such cases, a UE may monitor TTIs scheduled for multicast transmissions, even if the UE is not interested in the scheduled multicast transmission, in order to determine if the multicast-scheduled burst carries unicast data assigned to the UE. If a different cyclic prefix (CP) is used for unicast and eMBMS, the UE may refrain from monitoring unicast transmissions on the downlink (DL) symbols in which the UE is monitoring eMBMS. In some cases, the duration of a burst of eMBMS data may be indicated to the UE by overloading the physical uplink format indicator channel (PUFICH).

Different multicast data steams may be either time-division multiplexed (TDM) or frequency-division multiplexed (FDM). For example, different eMBMS may be transmitted on different frequency ranges. In some cases, one or more eMBMS transmissions may be transmitted on an enhanced component carrier (eCC). In order to accommodate both unicast and multicast transmissions, the bandwidth of the system may be partitioned according to transmission type. For example, in an 80 MHz system, the primary (e.g., middle) 20 MHz may be reserved for unicast transmissions and the remaining 60 MHz may be reserved for TTIs scheduled for multicast transmissions. In some cases, a cell-specific reference signal (CRS) may be front-loaded (e.g., may occupy several initial symbol periods) in the resources of a DL burst.

The symbol duration of an eMBMS symbol may be the same length as a unicast symbol, or it may be different. For example, the eMBMS symbols may include a longer cyclic prefix to cover a delay spread, which may be greater than the delay spread experienced by unicast symbols. Thus, although a TTI scheduled for multicast transmission may be aligned with the symbol boundary for a unicast transmission, the CP length and symbol boundary of the TTI scheduled for multicast transmission may be different from that of the unicast transmission.

When the resources allocated for eMBMS are used for unicast transmissions, demodulation reference signals (DMRS) may be used instead of CRS for unicast transmissions. Thus, the CRS resource elements (REs) may be replaced by DMRS or unicast data. In this or other examples, additional DMRS REs may be embedded with a low-density (e.g., sparsely distributed) inside physical downlink shared channel (PDSCH) symbols.

In a system that uses eMBMS resources for unicast transmissions, the eMBMS TTIs may start with a CRS preamble symbol and a unicast control symbol. The unicast control symbol may indicate to a UE the presence of unicast data conveyed by the multicast resources. Thus, a UE may monitor DL assignments when eMBMS resources are used for unicast transmissions. In some cases, the TTIs used for multicast control channel and multicast scheduling may be guaranteed for eMBMS transmissions. That is, a UE may know that the resources will not be used for unicast transmission. In such an instance, the UE may not monitor for unicast data and the CRS preamble (or unicast control symbol) may be removed from corresponding DL subframes. But the base station may still indicate the related DL symbols to all the UEs in a system information block (SIB). In order to indicate the eMBMS burst duration to UEs, the PUFICH may be overloaded. The downlink symbols may be based on DMRS or CRS transmissions.

A SIB may indicate the time and frequency resources allocated to eMBMS-scheduled TTIs. The SIB may also include information indicating the time and frequency resources allocated for multicast control channel (MCCH) transmissions (and layer information if needed). If a multicast traffic channel (MTCH) is multiplexed with MCCH, the modulation and coding scheme (MCS) and TTI for the MTCH may follow the MCS and TTI of MCCH. The MCCH may indicate the time and frequency resources allocated for each physical multicast channel (PMCH) and MCH scheduling information (MSI) (and layer information if needed). If MTCH is multiplexed with MSI, the MCS and TTI for MTCH may follow the MCS and TTI of MSI. If both MSI/MTCH and MCCH are multiplexed, the MCS and TTI may follow that of the MCCH configuration. The MSI may indicate the time and frequency resources allocated for each MTCH. The MSI may further indicate the number of TTIs and the number of symbols for each TTI in each MTCH.

In order to facilitate fast acquisition of MCCH and MSI for low latency transmissions, two physical control channels may be used: the physical multicast control channel (PMCCH) and the physical multicast scheduling indicator channel (PMSICH). The SIB may indicate the eMBMS symbols with each PMCCH. The PMCCH may indicate the eMBMS symbols with PMSICH. The PMCCH may also indicate the time and frequency resources allocated for each PMCH. The PMSICH may indicate the scheduling of the time and frequency resources allocated for each MTCH (e.g., the MSI). MSI may further indicate the number of TTIs (and number of symbols for each TTI) in each MTCH. PMCCH and PMSICH, if present, may be transmitted at the beginning of an MBMS TTI, such that they can be applied to subsequent eMBMS transmissions until PMCCH and PMSICH are updated.

In some cases, unicast data may be sent on eMBMS-scheduled resources instead of eMBMS data, which may be called transmission preemption. When transmission preemption is used in an FDM system, the unicast control region may be present within the region allocated for unicast transmissions, so that the UE may monitor for a preemption indication. In a TDM system, the preemption indication may be added to the eMBMS region and the eMBMS transmission rate may match the corresponding REs used for the preemption indication. However, if eMBMS uses extended CP, the UEs which are monitoring eMBMS or unicast transmissions may not receive the preemption indication simultaneously. Thus, a preemption indication may be reserved for when the eMBMS and unicast use the same CP length.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. For example, the base stations 105 may send control and data to UEs 115 via broadcast, multicast, or unicast transmissions. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on internet protocol (IP). A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions, from a UE 115 to a base station 105, or DL transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each carrier may be part of the system bandwidth, which may be the total range of frequencies dedicated for communication in wireless communications system 100. The system bandwidth may be allocated according to transmission type (e.g., unicast or multicast). Thus, a portion of the bandwidth may be reserved for unicast transmissions and a portion of the bandwidth may be scheduled for multicast transmissions. The modulated signals may be sent on different sub-carriers and may carry control information (e.g., reference signals, control channels, etc.), overhead information, user data, or the like. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data. In some cases, multi-path environments may introduce propagation delays (e.g., delay spread). A TTI scheduled for multicast transmission may be intended for UEs 115, which may be located at various distances from the transmission origin. Thus, a TTI scheduled for multicast transmission may experience different lengths of delay spread, which may be greater than those experienced by a unicast transmission. Accordingly, a TTI scheduled for multicast transmission may use a longer CP than a unicast transmission.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier,"

"component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A carrier may also be referred to as a CC, a layer, a channel, or the like. The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth (e.g., higher data rates). Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative acknowledgment (NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some examples, a CC configured for a UE 115 may be an eCC. An eCC may, for example, utilize variable TTIs, may include symbols of different duration than other CCs, or may utilize unlicensed spectrum.

Broadly speaking, the unlicensed spectrum in some jurisdictions may range from 600 MHz to 6 GHz. As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 KHz for a corresponding system bandwidth (with guardband) of 1.4, 3, 5, 10, 15, or 20 MHz, respectively. The system bandwidth may also be partitioned into sub-bands. For example, a sub-band may cover 1.08 MHz, and there may be 1, 2, 4, 8, or 16 sub-bands. In some cases, the system bandwidth may be partitioned according to transmission type (e.g., unicast or multicast). Thus, a portion of the bandwidth may be reserved for unicast transmissions and a portion of the bandwidth may be reserved for multicast (e.g., eMBMS) transmissions. For example, in an 80 MHz system, 20 MHz may be allocated for unicast transmissions and the remaining 60 MHz may be allocated for eMBMS-scheduled TTIs. The resources reserved for eMBMS may be contiguous or disjoint (e.g., the middle tones of the bandwidth may be allocated for unicast transmissions, leaving the edge tones for eMBMS-scheduled TTIs).

Data may be divided into logical channels, transport channels, and physical layer channels. Channels may also be classified into Control Channels and Traffic Channels. Logical control channels may include a paging control channel (PCCH) for paging information, a broadcast control channel (BCCH) for broadcast system control information, a MCCH for transmitting multimedia broadcast multicast service (MBMS) scheduling and control information, a dedicated control channel (DCCH) for transmitting dedicated control information, common control channel (CCCH) for random access information, DTCH for dedicated UE data, and MTCH, for multicast data.

DL transport channels may include a broadcast channel (BCH) for broadcast information, a downlink shared channel (DL-SCH) for data transfer, a paging channel (PCH) for paging information, and a multicast channel (MCH) for TTI scheduled for multicast transmissions. UL transport channels may include random access channel (RACH) for access and uplink shared channel (UL-SCH) for data. DL physical channels may include a physical broadcast channel (PBCH) for broadcast information, a physical control format indicator channel (PCFICH) for control format information, a physical downlink control channel (PDCCH) for control and scheduling information, a physical HARQ indicator channel (PHICH) for HARQ status messages, a physical downlink shared channel (PDSCH) for user data and physical multicast channel (PMCH) for multicast data.

UL physical channels may include a physical random access channel (PRACH) for access messages, a physical uplink control channel (PUCCH) for control data, and a physical uplink shared channel (PUSCH) for user data. DL physical channels may include a physical uplink format indicator channel (PUFICH) and a physical downlink format indicator channel (PDFICH), which may indicate the length of uplink and downlink transmissions, respectively. In some cases, the PUFICH may be used to indicate the length of an eMBMS burst duration within a downlink transmission. Additionally, there may be a PMCCH and a PMSICH to support eMBMS. PMCCH may indicate the time and frequency resources allocated for each PMCH (e.g., up to 15 MTCHs) and the MSI (and layer information if needed). If MTCH is multiplexed with MSI, the MCS and TTI for MTCH may follow MCS and TTI for MSI. PMSICH may indicate the scheduling of the time and frequency resources allocated for each MTCH (e.g., the MSI). MSI may further indicate the number of TTIs (and number of symbols for each TTI) in each MTCH.

In some cases, an eMBMS burst may be transmitted with different TTI durations for control and multicast data. For example, an eMBMS burst may have 100 symbols, where the first symbol(s) are used for control information (e.g., MSI, MCCH, etc.) and the remaining symbols include multicast data (e.g., MTCH). In such cases, the control information may be transmitted with a minimum TTI length.

PDCCH may carry downlink control information (DCI) in control channel elements (CCEs), which may include nine logically contiguous resource element groups (REGs), where each REG contains four REs. DCI may include information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI may include additional signaling information. DCI size and format may depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region may be monitored by all UEs 115 served by a base station 105 and may include information such as paging information, system information, random access procedures and the like. The UE-specific search space may include user-specific control information. CCEs may be indexed, and the common search space may start from CCE 0. The starting index for a UE specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a CRC check to determine whether the attempt was successful. In some cases, the CCEs may be enhanced CCEs (eCCEs). That is, they may be designed for use in conjunction with eCCs, which may include the use of reduced symbol periods or more flexible scheduling rules.

After receiving synchronization information and a master information block (MIB), a UE 115 may receive one or more system information block (SIBs). Different SIBs may be defined according to the type of system information conveyed. For instance, SIB 1 may include access information, such as cell identity information, and may also indicate whether a UE 115 is allowed to camp on a cell. SIB1 may also include cell selection information (or cell selection parameters). Additionally, SIB1 may include scheduling information for other SIBs. SIB2 may include access information and parameters related to common and shared channels. SIB3 may include cell reselection parameters. SIB4 and SIB5 may include reselection information about neighboring LTE cells. SIB6 through SIB8 may include reselection information about non-LTE (e.g., Universal Mobile Telecommunications System (UMTS), GERAN, and code division multiple access (CDMA)) neighboring cells). SIB9 may include the name of a Home eNB or base station. SIB10 through SIB12 may include emergency notification information (e.g., tsunami and earthquake warnings). And SIB13 may include information related to eMBMS configuration. In some cases, a SIB may be used to indicate the time and frequency resources allocated to eMBMS-scheduled TTIs, which may be used by both eMBMS UEs 115 and non-MBMS UEs 115.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame. Use of TDD offers flexible deployments without requiring paired UL-DL spectrum resources.

In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. Regardless of how UL and DL transmissions are duplexed, UL and DL signals for different UEs 115 (including multicast signals) may be multiplexed according to FDM or TDM.

Some base stations 105 may utilize a portion of the available downlink bandwidth to broadcast multimedia data to some or all UEs 115 within the coverage area 110. For example, a wireless communication system may be configured to broadcast mobile TV content, or to multicast live event coverage to UEs 115 located near a live event, such as a concert or sporting event. In some cases, this may enable more efficient utilization of the bandwidth. These base stations may be referred to as eMBMS or eMBMS cells. In some cases, eMBMS cells may be grouped together in an eMBMS single frequency network (MB SFN) such that the broadcast media is transmitted on the same frequency resources by each supporting cell. However, some UEs 115 in the coverage area may elect not to receive the eMBMS data. In some cases, there may not be any eMBMS data available to send, or the eMBMS data may have a lower priority than available unicast data. In such instances, the unicast data may be sent instead of eMBMS data, using resources allocated for eMBMS-scheduled TTIs. In order to indicate that unicast data has replaced eMBMS data, a downlink transmission may include a control symbol at the beginning of the downlink burst. Thus, a UE may reference the control symbol to determine if an eMBMS-scheduled TTI includes data assigned to the UE. For example, the control symbol may include a control message (e.g., a preemption indication) which indicates that higher-priority unicast data has replaced lower-priority multicast data in an eMBMS-scheduled TTI.

A base station 105 may insert periodic pilot symbols such as cell-specific reference signals (CRS) to aid UEs 115 in channel estimation and coherent demodulation. CRS may include one of 504 different cell identities. The cell identities may be modulated using quadrature phase shift keying (QPSK) and power boosted (e.g., transmitted at 6 dB higher than the surrounding data elements) to be resilient to noise and interference. CRS may be embedded in 4 to 16 resource elements in each resource block based on the number of antenna ports or layers (up to 4) of the receiving UEs 115. Sometimes, a CRS preamble symbol may be present at the beginning of a downlink transmission (e.g., an eMBMS-scheduled burst). The CRS preamble symbol may provide CRS in addition to the embedded CRS. In addition to CRS, which may be utilized by all UEs 115 in the coverage area 110 of the base station 105, a DMRS may be directed toward specific UEs 115 and may be transmitted on resource blocks assigned to those UEs 115. In some cases, the DMRS may include signals on six resource elements in each resource block in which they are transmitted. In some cases, two sets of DMRS may be transmitted in adjoining resource elements. In this or other cases, the DMRS may take the place of CRS using the resources associated with CRS. In some cases, additional reference signals known as channel state information reference signals (CSI-RS) may be included to aid in generating channel state information (CSI). On the UL, a UE 115 may transmit a combination of a periodic sounding reference signal (SRS) and an UL DMRS for link adaptation and demodulation, respectively. The configuration of reference signals may be based on the length of the CP used for the transmission.

According to the description above, a wireless system may send unicast data using resources allocated for multicast transmissions. The presence of unicast data in a TTI scheduled for multicast transmission may be indicated by a control region within the TTI. A UE may monitor the control region to identify the presence of unicast information. A TTI scheduled for multicast transmission may also include reference signals to aid in the demodulation of multicast or unicast data. In some cases, the reference signals may be front-loaded at the beginning or embedded within the TTI. The embedded reference signals may be configured based on the type of data carried by the TTI scheduled for multicast transmission, or by length of the cyclic prefix used by the TTI scheduled for multicast transmission.

Figure 2:
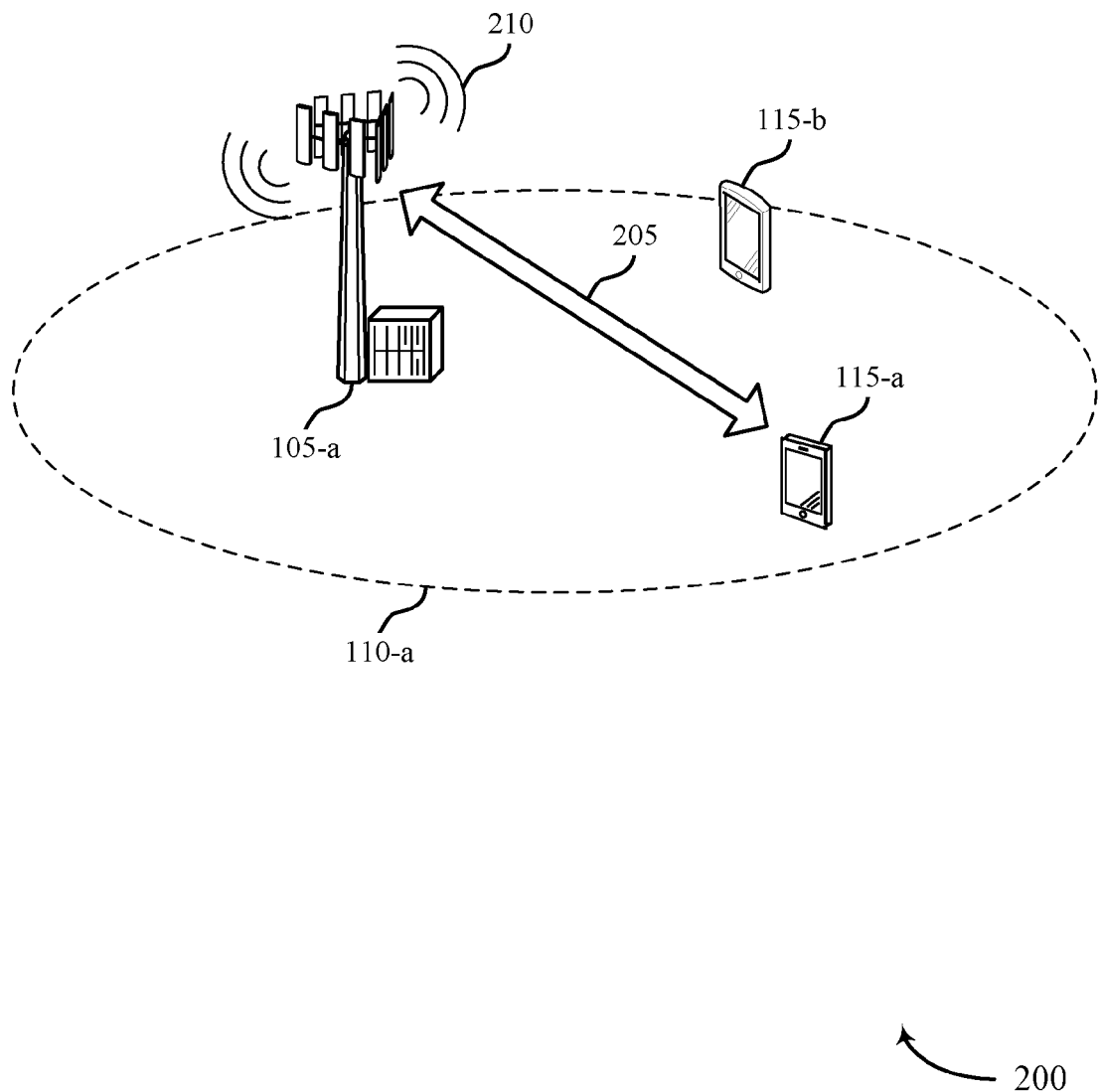
FIG. 2 illustrates an example of a wireless communications system for eMBMS on eCCs in accordance with various aspects of the present disclosure.

FIG. 2 illustrates an example of a wireless communications system 200 for eMBMS on eCCs in accordance with various aspects of the present disclosure. Wireless communications system 200 may include UE 115-a and a UE 115-b, which may be examples of a UE 115 described with reference to FIG. 1. Wireless communications system 200 may also include a base station 105-a, which may be an example of a base station 105 described above with reference to FIG. 1. Base station 105-a may transmit control and data to any UE 115 within its coverage area 110-a via a communication links (e.g., unicast communication link 205). A unicast communication link 205 may allow for bidirectional communication between a UE 115 and a base station 105 via downlink and uplink transmissions, as generally described with respect to FIG. 1.

Base station 105-a may transmit control and data information intended specifically for UE 115-a using radio resources (e.g., time and frequency) within a unicast TTI. Base station 105-a may also transmit broadcast and multicast signals 210, which may be intended for more than one UE 115 (e.g., both UE 115-a and UE 115-b) within coverage area 110-a. In some instances, base station 105-a may send multicast packets using an eMBMS. The eMBMS data may be sent on MTCHs, which may be multiplexed using either FDM or TDM.

In some cases, there may be a surplus of time and frequency resources allocated for eMBMS-scheduled TTIs—e.g., the eMBMS data may use a fraction, or none, of the reserved resources. If there is no eMBMS data available for transmission during a subframe, the radio resources allocated for eMBMS-scheduled TTIs may be used to send unicast data in that subframe. In some cases, there may be eMBMS data available for transmission but unicast data with a higher priority may be sent on the multicast resources instead (e.g., in a process called preemption). Indications may be sent to a UE 115 which carry information regarding the type of transmission (e.g., unicast or eMBMS) conveyed by the eMBMS resources. For example, each downlink eMBMS-scheduled TTI may include a control symbol which a UE 115 may monitor to determine the characteristics of the downlink. Thus, even if a UE 115 is not interested in a particular eMBMS, the UE 115 may still monitor the control symbol of the eMBMS-scheduled TTI to determine whether it carries unicast data assigned to the UE 115.

In one example, base station 105-a may allocate time-frequency resources of the system bandwidth according to the type of transmission—e.g., base station 105-a may reserve a central set of subcarriers for unicast transmissions and a set of outer subcarriers for eMBMS-scheduled TTIs. In some cases, the symbol duration for an eMBMS-scheduled TTI may be different than unicast symbol duration. For example, the eMBMS-scheduled symbol duration may be longer to compensate for the possible range of locations for UEs 115 receiving the signal. That is, an eMBMS signal intended for several UEs 115 within coverage area 110-a may experience various transmit path lengths, which may result in large delay spread. Thus, an eMBMS symbol may use a long CP length to cover a large range of delay spread. Although the CP length and symbol boundary for an eMBMS transmission may be different than that of a unicast transmission, the TTIs for eMBMS and unicast transmissions may be aligned (e.g., when FDM is used).

Regardless of the transmission type, a UE 115 may use reference signals to decode assigned data. For example, a UE 115 may use a CRS or a DMRS to demodulate data-carrying portions of a downlink signal. Specifically, the UE 115 may use a CRS in order to determine and maintain an estimation of downlink channel characteristics in order to perform coherent demodulation of the downlink signal. In some cases, a UE 115 may use a DMRS as a reference for demodulation. For example, when multicast resources are used for unicast transmissions, wireless system 200 may embed the DMRS in the allocated resources. Resource elements (REs) originally reserved for CRS may be replaced by an additional DMRS. In another example, an additional DMRS may be embedded (e.g., with a low density) inside PDSCH symbols.

Thus, wireless system 200 may include unicast data using resources allocated for multicast transmissions. The presence of unicast data in a TTI scheduled for multicast transmission may be indicated by a control region within a set of resources scheduled for multicast signal 210. UE 115-a may monitor the control region to identify the presence of unicast information. A TTI scheduled for multicast transmission may also include reference signals to aid in the demodulation of multicast or unicast data. In some cases, the reference signals may be front-loaded at the beginning, or embedded within the TTI. The embedded reference signals may be configured based on the type of data carried by the TTI scheduled for multicast transmission, or by length of the cyclic prefix used by the TTI scheduled for multicast transmission.

Figure 3A:
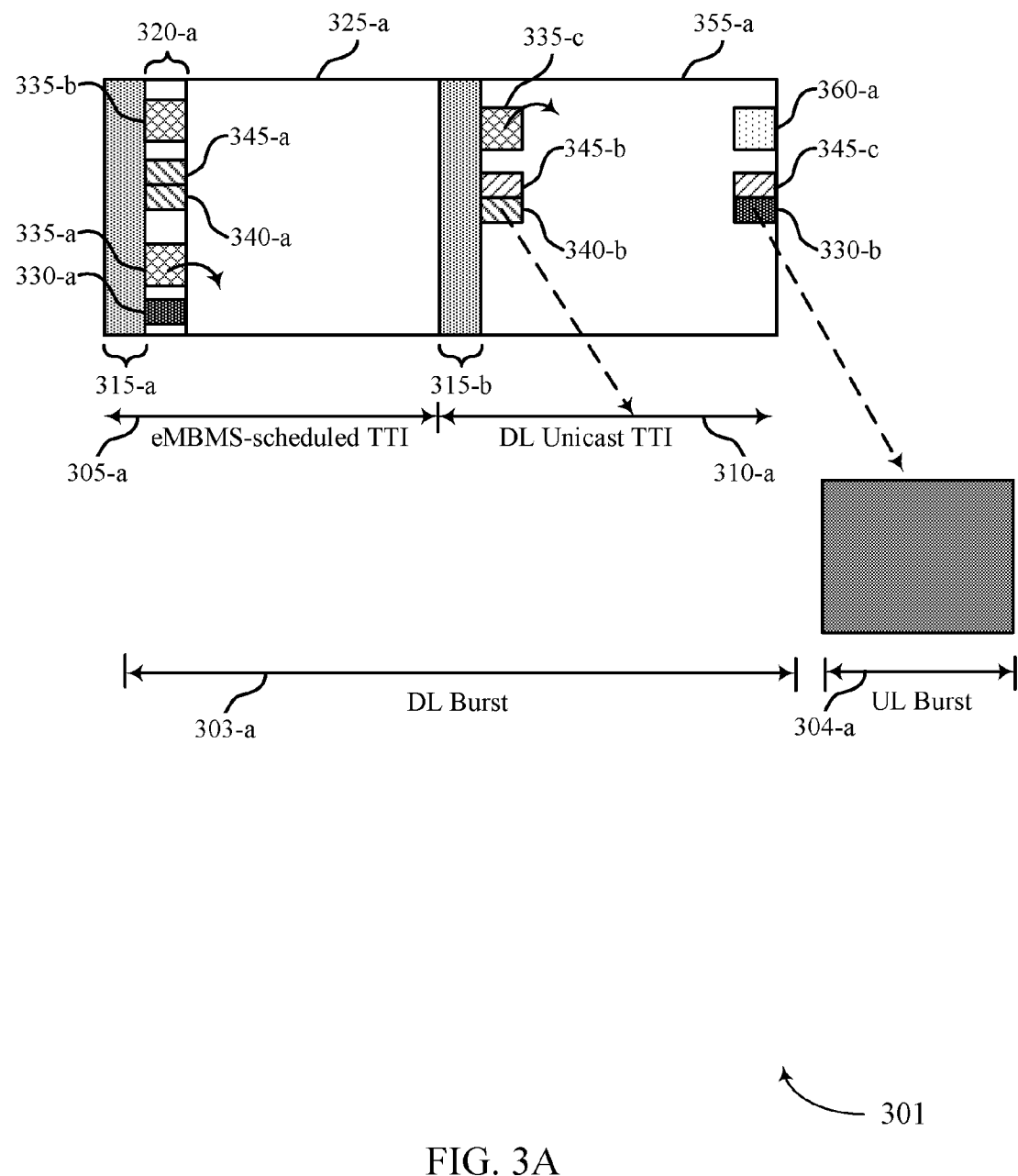
FIG. 3A illustrates an example of an UL/DL burst configuration for eMBMS on eCCs in accordance with various aspects of the present disclosure.

FIG. 3A illustrates an example of an UL/DL burst configuration 301 for eMBMS on eCCs in accordance with various aspects of the present disclosure. UL/DL burst configuration 301 may illustrate an example of a bidirectional communication used between a UE 115 and a base station 105, as described generally in FIG. 2. UL/DL burst configuration 301 may include DL burst 303-a and UL burst 304-a. DL burst 303-a may include downlink eMBMS-scheduled TTI 305-a, which may be a TTI with resources allocated for eMBMS-scheduled TTIs, and downlink unicast TTI 310-a, which may convey unicast information intended for one or more UEs 115. UL/DL burst configuration 301 may be realized using various types of multiplexing, such as FDM and TDM.

As described above, eMBMS-scheduled TTI 305-a may carry unicast data when eMBMS data is not available, or when unicast data has higher priority than eMBMS data. Regardless of the type of data conveyed by eMBMS-scheduled TTI 305-a, eMBMS-scheduled TTI 305-a may include a CRS preamble symbol 315-a and a unicast control symbol 320-a. CRS preamble symbol 315-a may convey CRS for a UE 115 to use in coherent demodulation, and unicast control symbol 320-a may convey control information for eMBMS-scheduled TTI 305-a, as well as indicate the type of data conveyed by eMBMS-scheduled TTI 305-a (e.g., unicast or eMBMS). Thus, a UE 115 may monitor unicast control symbol 320-a to determine whether eMBMS-scheduled TTI 305-a carries unicast data on resources schedule for eMBMS transmission.

Unicast control symbol 320-a may include PUFICH) 330-a and PDFICH 340-a, which may convey the duration of a subsequent uplink burst (if present) and the duration of a downlink burst (e.g., the length of eMBMS-scheduled TTI 305-a), respectively. If eMBMS-scheduled TTI 305-a is not followed by an uplink burst, PUFICH 330-a may be used to convey the duration of eMBMS-scheduled TTI 305-a that may be used for unicast data. Unicast control symbol 320-a may also include PDCCH 335-a, which may indicate unicast data resource assignments for a UE 115. For example, when eMBMS-scheduled TTI 305-a is used for a unicast transmission, PDCCH 335-a may indicate which resource elements carried by PDSCH are assigned to a UE 115. Unicast control symbol 320-a may also include PDCCH 335-b to indicate multicast data resource assignments for multiple UEs 115. For example, when eMBMS-scheduled TTI 305-a is used for eMBMS data, PDCCH 335-b may convey to a UE 115 which resource elements of PMCH 325-a carry multicast data. A PCFICH 345-a may be present in unicast control symbol 320-a. PCFICH 345-a may indicate the length (e.g., the number of symbols) used for PDCCH 335-a or PDCCH 335-b.

In addition to eMBMS-scheduled TTI 305-a, DL burst 303-a may include DL unicast TTI 310-a. Unicast TTI 310-a may convey unicast data for one or more UEs 115 using time-frequency resources reserved for unicast transmissions. Similar to eMBMS-scheduled TTI 305-a, unicast TTI 310-a may begin with a CRS preamble symbol 315-b. Unicast TTI 310-a may not have a unicast control symbol, because unicast TTI 310-a may be used strictly for unicast transmissions (e.g., unicast TTI 310-a may not need to indicate the type of data it conveys because a UE 115 may assume that the data is unicast). However, unicast TTI 310-a may include PUFICH 330-b, PDFICH 340-b, and PCFICH 345-b, which may convey format and control information as described above. Unicast TTI 310-a may also include PDCCH 335-c, which may indicate unicast data assigned to a UE 115 which is carried on PDSCH 355-a. Unicast TTI 310 may also include resources which indicate uplink grants (e.g., uplink grant 360-a) from a base station 105. Accordingly, unicast TTI 310-a may include PCFICH 345-c, which may indicate the length of UL grant 360-a.

Figure 3B:
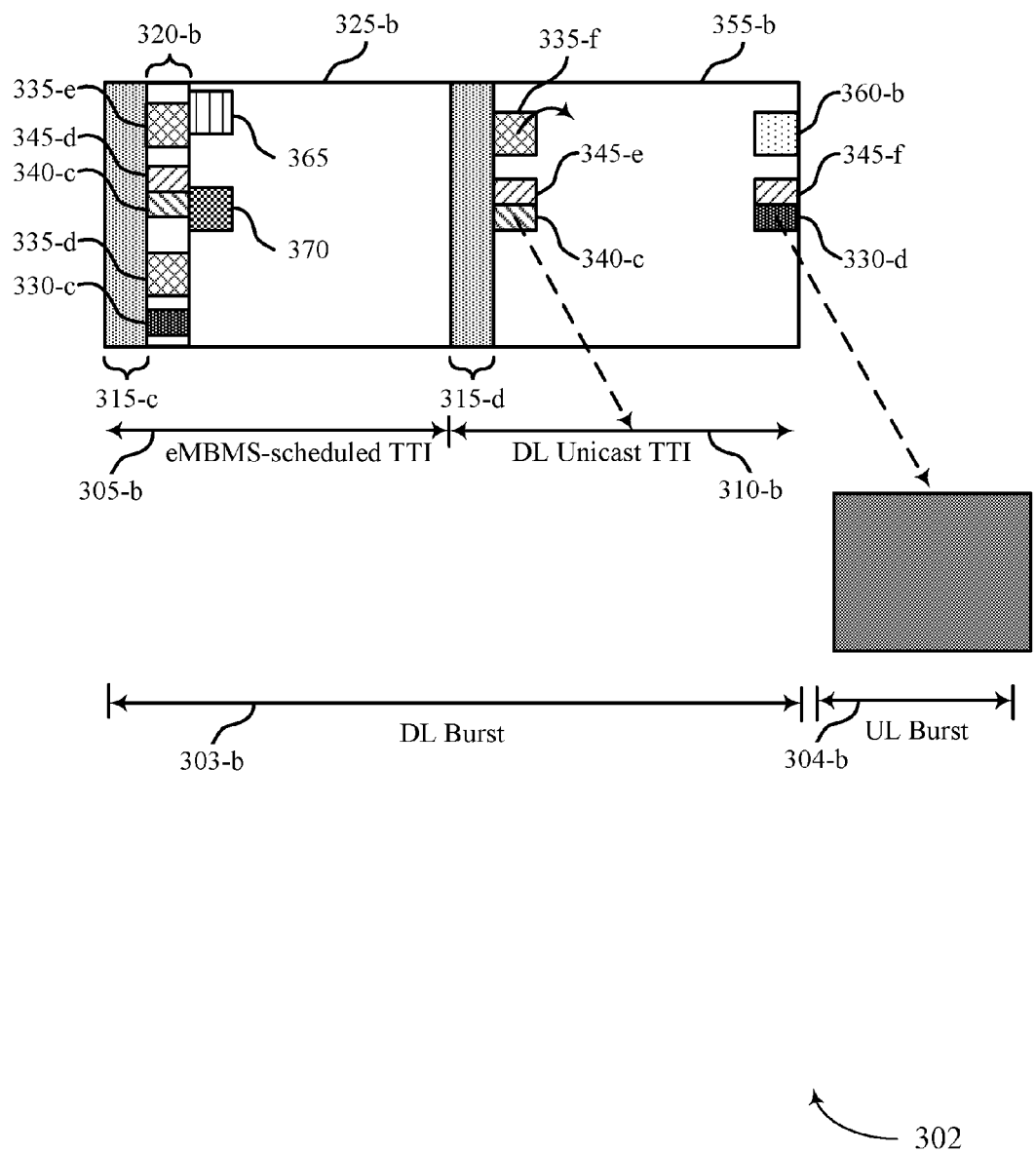
FIG. 3B illustrates an example of an UL/DL burst configuration for eMBMS on eCCs in accordance with various aspects of the present disclosure.

FIG. 3B illustrates an example of an UL/DL burst configuration 302 for eMBMS on eCCs in accordance with various aspects of the present disclosure. UL/DL burst configuration 302 may illustrate an example of a bidirectional communication used between a UE 115 and a base station 105, as described generally in FIG. 2. UL/DL burst configuration 302 may include DL burst 303-b and uplink burst 304-b. DL burst 303-a may include DL eMBMS-scheduled TTI 305-b, which may be a TTI with resources which are allocated for eMBMS-scheduled TTIs and which convey eMBMS data. DL burst 303-b may also include DL unicast TTI 310-b, which may convey unicast information intended for one or more UEs 115. UL/DL burst configuration 302 may be implemented using FDM or TDM.

eMBMS-scheduled TTI 305-b may include a CRS preamble symbol 315-c, PMCH 325-b, and unicast control symbol 320-b. Unicast control symbol 320-b may include PUFICH 330-c, PDCCH 335-d, PDCCH 335-e, PDFICH 340-c, and PCFICH 345-d, which may convey format and control information for eMBMS-scheduled TTI 305-b. The eMBMS-scheduled TTI 305-b may further include physical multicast control channel (PMCCH) 365 and PMSICH 370. PMCCH 365 may indicate the time and frequency resources allocated for each PMCH and the MSI (and layer information if needed). PMSICH 370 may indicate the scheduling of the time and frequency resources allocated for each MTCH (e.g., the multicast scheduling information (MSI)). The MSI may further indicate the number of TTIs (and number of symbols for each TTI) in each MTCH (e.g., the MSI may indicate which TTIs are used for a certain MTCH in an upcoming scheduling period).

In some cases, a base station 105 may guarantee multicast control channel (MCCH) and a MSI transmission for eMBMS-scheduled TTIs. In such an instance, the CRS preamble symbol 315 and the unicast control symbol 320 may be irrelevant, because a UE 115 may assume that the eMBMS-scheduled TTI carries eMBMS data. Thus, an eMBMS-scheduled TTI 305 with guaranteed multicast transmission may not include a CRS preamble symbol 315 or unicast control symbol 320, and a UE 115 may refrain from monitoring the eMBMS-scheduled TTI 305 for unicast data.

In some cases, the CRS preamble symbol 315 may not be sufficient for a UE 115 to estimate channel characteristics. Accordingly, the UE 115 may be inhibited from accurately performing coherent demodulation, which may increase data decoding errors. Thus, an eMBMS-scheduled TTI 305 may embed pilot tones, such as CRS or DMRS, in the data-bearing portion (e.g., PMCH 325) of the eMBMS-scheduled TTI 305.

The eMBMS-scheduled TTI 305-b may be followed by DL unicast TTI 310-b. Unicast TTI 310-b may convey unicast data for one or more UEs 115 using radio resources allocated for unicast transmissions. DL unicast TTI 310-b may begin with a CRS preamble symbol 315-d. However, DL unicast TTI 310-b may not have a unicast control symbol, because DL unicast TTI 310-b may be used strictly for unicast transmissions. DL unicast TTI 310-b may include PUFICH 330-d, PDFICH 340-c, and PCFICH 345-e, which may convey format and control information as described above (e.g., PUFICH 330-d may indicate the length of UL burst 304-b). Unicast TTI 310-b may also include PDCCH 335-f, which may indicate unicast data assigned to a UE 115 which is carried on PDSCH 355-b. DL unicast TTI 310-b may also include resources that indicate uplink grants (e.g., uplink grant 360-b) from a base station 105. Accordingly, DL unicast TTI 310-b may include PCFICH 345-e, which may indicate the length of UL grant 360-b.

Figure 4:
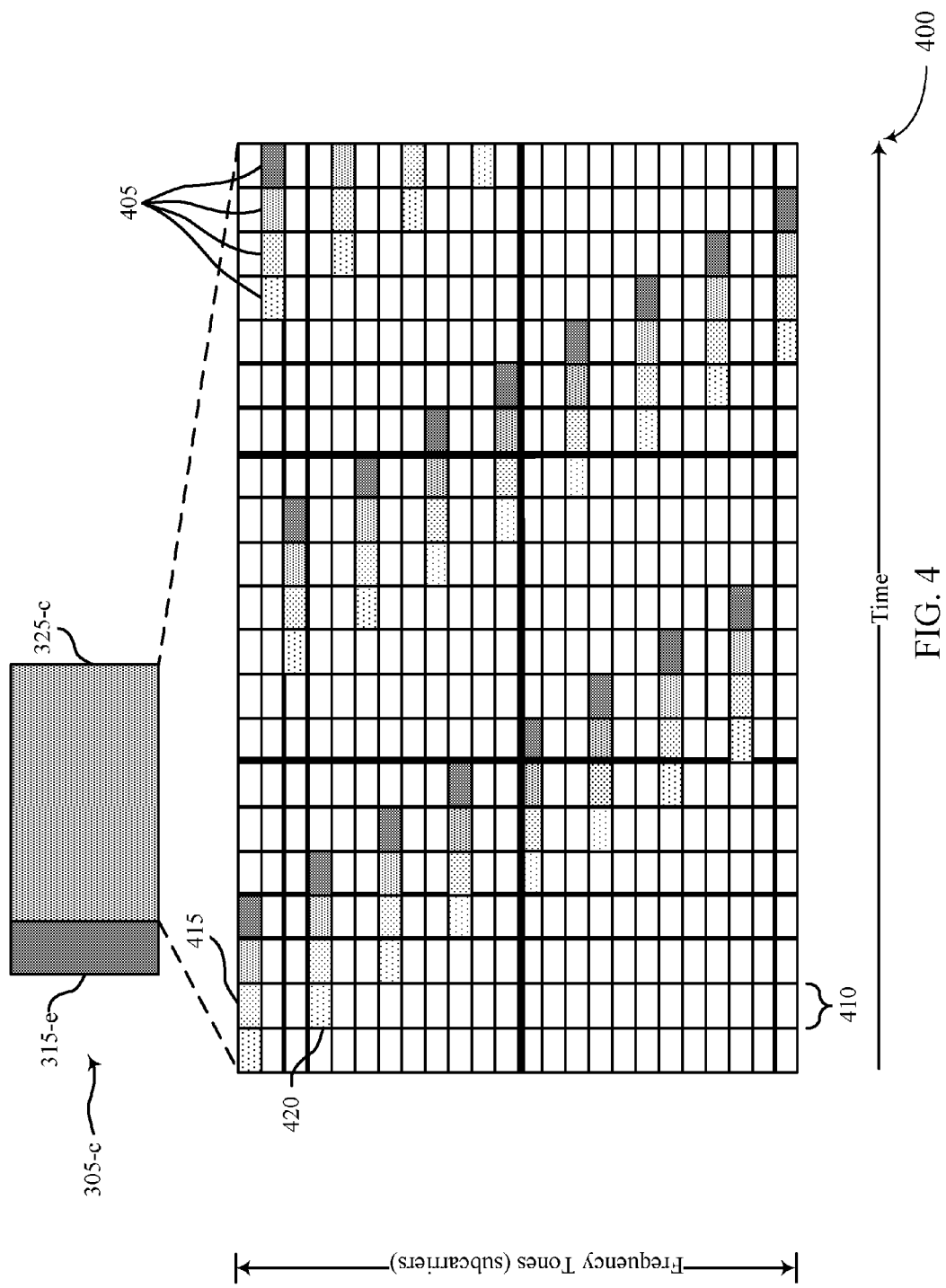
FIG. 4 illustrates an example of a DL burst pilot pattern including an expanded view of a DL TTI for eMBMS on eCCs in accordance with various aspects of the present disclosure.

FIG. 4 illustrates an example of DL burst pilot pattern 400 including an expanded view of a DL TTI for eMBMS on eCCs in accordance with various aspects of the present disclosure. DL burst pilot pattern 400 may be used for communications between a UE 115 and a base station 105 that includes resources scheduled for eMBMS as described above with reference to FIGS. 1-3B. For example, DL burst pilot pattern 400 may represent the pilot pattern for a DL unicast TTI that was originally scheduled for an eMBMS. In another example, DL burst pilot pattern 400 may be used for an eMBMS TTI. In some cases, if DL burst pilot pattern 400 is used for eMBMS, the number of antenna ports may be limited (e.g., to two). This may impact the number of pilot tones.

DL burst pilot pattern 400 may include an example of time and frequency resource elements of DL TTI 305-c representing example locations of pilot tones 405. In some cases, DL TTI 305-c may include a CRS preamble symbol 315-e and DL symbols (e.g., PMCH 325-c) with embedded pilot tones. Pilot tones may be used by a UE 115 to determine channel characteristics corresponding to individual antenna ports. In some cases, the pilot tones 405 may be CRSs. In one example, pilot tones for a first antenna may be transmitted on regularly spaced tones (every 25 tones in this example) in each symbol, where the index (offset) of the pilot tone is shifted by a certain amount (3 in this example) every symbol. The pattern may be repeated every N symbols (25 symbols in this example). In other words, the overhead per port may be 1 pilot symbol for every 25 REs.

Pilots for different transmit antennas may be transmitted on different tone locations within a symbol. For example, during symbol 410, a pilot corresponding to a first port (e.g., pilot 415) may be conveyed by a different tone than a pilot corresponding to a second port (e.g., pilot 420). DL burst pilot pattern 400 represents one possible pattern for pilot transmission in a DL burst 405, but other pilot patterns may also be used. For example, if DL TTI 305-c is sent using a two port configuration, two pilots may be used. In some cases, the pilot configuration may be based on the length of the cyclic prefix (CP). For instance, if an eMBMS-scheduled TTI uses the same CP as a unicast transmission, the eMBMS-scheduled TTI may use the same pilot configuration as the unicast transmission. If the eMBMS-scheduled TTI uses a longer CP than the unicast transmission, the eMBMS-scheduled TTI may use a higher density pilot configuration (or have a minimum TTI length).

The pilot configuration depicted by DL burst pilot pattern 400 may be used in eMBMS TTIs and unicast transmissions which are conveyed on resources reserved for eMBMS. In some cases, a UE 115 may perform a CRS on/off detection that indicates when to combine CRS from previous unicast regions for coherent CRS detection. According to the present disclosure, a UE 115 may monitor a wireless channel from a base station 105 for a pilot transmission (e.g., as part of DL burst pilot pattern 400). In some cases, the UE 115 may detect a pilot and determine that the transmission is a DL transmission (e.g., DL TTI 305-c). The UE 115 may then verify that DL TTI 305-c is a DL TTI by decoding a known physical layer DL channel. In other cases, the UE 115 may identify an absence of any pilot transmissions on the wireless channel during the TTI and may determine that the interval is an UL TTI. Based on whether the TTI is for UL or DL, the UE 115 may generate channel estimates, decode allocated resources, enter a low power state, or determine the timing of future transmissions.

Figure 5:
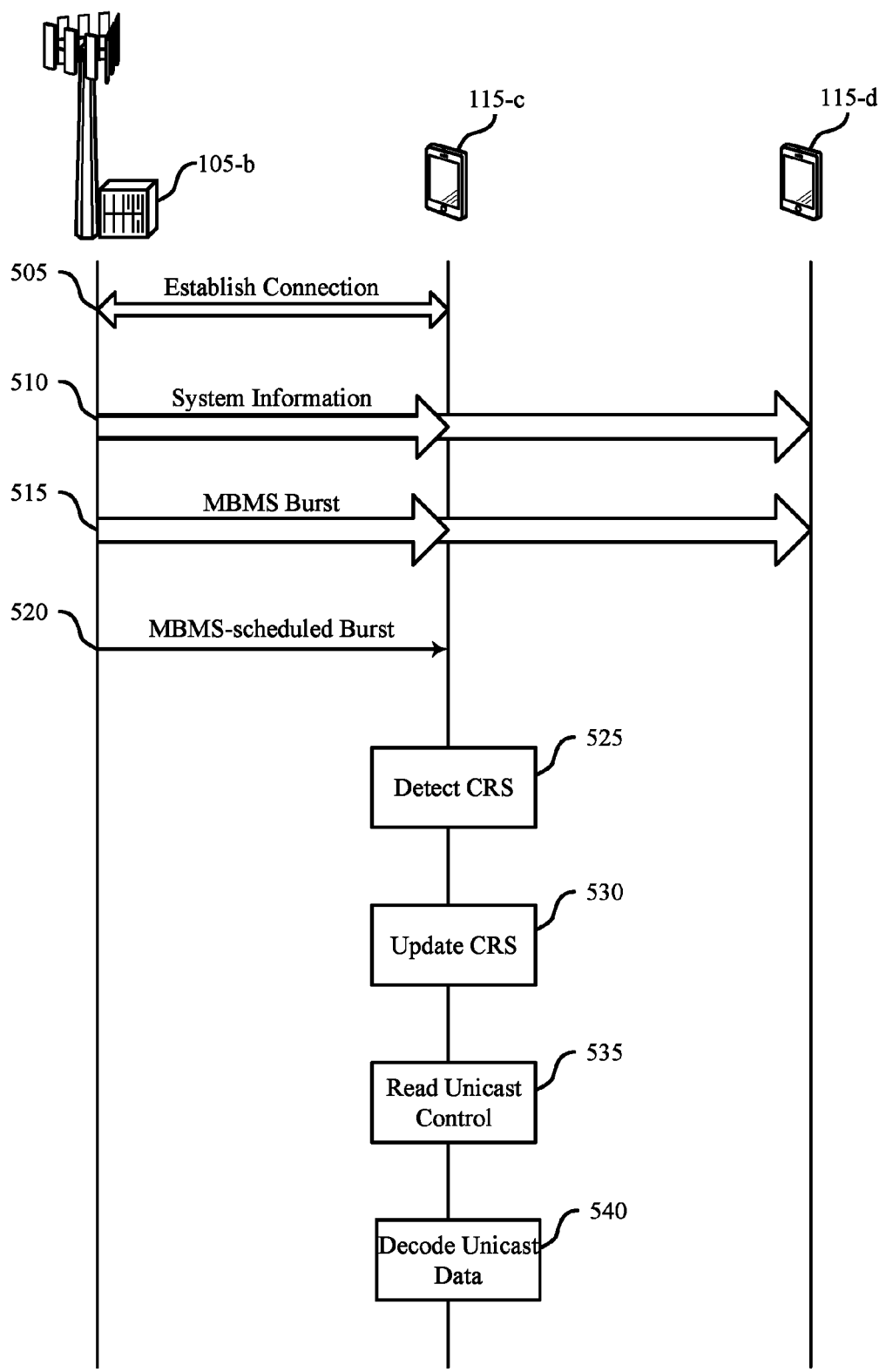
FIG. 5 illustrates an example of a process flow for eMBMS on eCCs in accordance with various aspects of the present disclosure.

FIG. 5 illustrates an example of a process flow 500 for eMBMS on eCCs in accordance with various aspects of the present disclosure. The described techniques may apply to a variety of different systems such as LTE systems and other radio technologies (including FDD and TDD systems). Process flow 500 may include UE 115-c and UE 115-d, which may be examples of UEs 115 described above with reference to FIG. 1. Process flow 500 may also include a base station 105-b, which may be an example of a base station 105 described above with reference to FIG. 1. Additionally, process flow 500 may be an example of a bi-directional communication scheme between any base station 105 and UE 115, such as described with reference to FIGS. 1-4.

At step 505, base station 105-b may establish a connection with UE 115-c. Base station 105-b may also establish (or already have) a connection with UE 115-d. At step 510, base station 105-b may broadcast system information, e.g., using a MIB and SIBs. SIBs may indicate the time and frequency resources allocated to eMBMS (e.g., UE 115-c may receive a SIB indicating a set of resources for the PMCCH). SIBs may also indicate the time and frequency resources for MCCH transmissions, or layer information. In some cases, SIBs may indicate DL symbols which do not have CRS preambles or unicast control symbols. In some cases UE 115-c may receive a PMCCH transmission indicating a set of time and frequency resources for a PMCH. UEs 115-c and 115-d may also receive a PMSICH transmission indicating a set of time and frequency resources for an MTCH based on the PMCCH. The MSI may further indicate the number of TTI and the number of symbols for each TTI for each MTCH.

In the event that MTCH is multiplexed with MCCH, the modulation and coding scheme (MCS) for MTCH may differ from the MCS corresponding to MCCH. The MCCH may indicate the time and frequency resources allocated for each PMCH and MSI (and layer information if needed). If MTCH is multiplexed with MSI, MTCH may follow MSI. If both MSI/MTCH and MCCH are multiplexed, MSI/MTCH may follow the corresponding MCCH.

At step 515, base station 105-b may transmit an eMBMS burst conveying multicast data. UE 115-c and UE 115-d may receive the eMBMS burst, but UE 115-c may not be interested in the multicast information. Still, UE 115-c may monitor for a unicast control symbol in case unicast data is transmitted during the eMBMS-scheduled burst. In other cases, the eMBMS burst may be guaranteed to convey eMBMS data. Thus, eMBMS burst may not include a unicast control symbol, and UE 115-c may refrain from monitoring the eMBMS burst. Accordingly, UE 115-d may decode the multicast data carried by the eMBMS burst.

At step 520, base station 105-b may transmit (and UE 115-c may receive) an eMBMS-scheduled burst conveying unicast information assigned to UE 115-c. Accordingly, UE 115-c may determine that the eMBMS-scheduled burst is scheduled for an eMBMS, but may carry unicast data. The set of resources for the eMBMS-scheduled burst may be determined by receiving a SIB indicating the eMBMS-scheduled resources and receiving a MCCH based on the SIB. The eMBMS-scheduled burst may include pilots, such as CRS, which may be arranged in a reference signal configuration. The CRS may be embedded in the eMBMS-scheduled burst or front-loaded in a CRS preamble symbol at the beginning of a subframe within the eMBMS-scheduled burst (e.g., the first symbol period of the eMBMS-scheduled burst may be associated with the CRS preamble). According to some aspects, the reference signal configuration may include both CRS and DMRS. In some examples, the reference signal configuration is based on a minimum TTI length or an increased reference signal density based on the CP length. For example, base station 105-b may select a reference signal configuration based on the extended CP length used by the eMBMS-scheduled TTI.

Regardless of the reference signal configuration, at step 525, UE 115-c may detect the presence of CRS pilots. For example, UE 115-c may perform CRS on/off detection for one or more subframes of the eMBMS-scheduled burst. Based on the CRS on/off detection, UE 115-c may receive at least one CRS during the subframe. UE 115-c may then combine the CRS with accumulated CRS data. In some cases, the reference signal configuration may include DMRS instead of or in addition to the CRS. Accordingly, at step 525, UE 115-c may receive at least one DMRS during the eMBMS-scheduled subframe. The DMRS may utilize at least one resource element associated with a CRS pattern. In some cases, the DMRS may utilize a low-density resource pattern based on a set of non-CRS resource elements.

UE 115-c may then determine that a symbol period of the eMBMS-scheduled burst is a unicast control symbol period. Furthermore, UE 115-c may identify a control message (e.g., an eMBMS preemption indication, a unicast indication, a message indicating the length of the DL burst, or a PDCCH) in the unicast control symbol period which indicates that unicast data is utilizing the resources of the eMBMS-scheduled burst. For example, UE 115-c may receive an eMBMS preemption indication and determine that the eMBMS-scheduled burst contains unicast data (e.g., unicast data with a higher priority than multicast data). In other words, UE 115-c may determine that the set of resources scheduled for the eMBMS contains unicast data based on the preemption indication. In one example, the control message may be sent or received during the unicast control symbol period of the eMBMS-scheduled burst and a unicast data transmission may be sent or received during the eMBMS-scheduled burst. The reception or transmission of the unicast data transmission may be based on the control message. In some instances, the control message may use a PUFICH format or resource assignment. The control message(s) in the control symbol period may be used regardless of whether the eMBMS-scheduled burst is used for eMBMS or for unicast data. For example, one or more control messages may be used to indicate the presence of eMBMS and/or transmission interval in subsequent symbols.

At step 530, UE 115-c may update accumulated CRS data based on the received CRS. In some cases, the combining may be based on the CRS on/off detection. At step 535, UE 115-c may read control information using the accumulated CRS data. At step 540 UE 115-c may decode the unicast data. The decoding may be based on control information indicating the resource elements assigned to UE 115-c.

In some cases, UE 115-c or base station 105-b may determine a set of resources scheduled for a second eMBMS-scheduled burst. According to one example, the first eMBMS-scheduled burst and the second eMBMS-scheduled burst may be multiplexed according to an FDM configuration. In another example, the first eMBMS-scheduled burst and the second eMBMS-scheduled burst may be multiplexed according to a TDM configuration. In some cases, the resources scheduled for the eMBMS-scheduled bursts may be based on a reduced symbol period. Moreover, the reduced symbol period may correspond to an eCC configuration. In some cases, the reduced symbol period may be equal to a clear channel assessment (CCA) length. The reduced symbol period may be based on an extended CP length. In some cases, the reduced symbol period may correspond with a bandwidth range associated with the eMBMS-scheduled burst. There may be a second reduced symbol period which is based on a non-extended CP length and which corresponds to a bandwidth range associated with unicast transmission. Accordingly, base station 105-b may select an extended CP length for the bandwidth range based on the determination of the bandwidth range scheduled for the eMBMS-scheduled burst.

Figure 6:
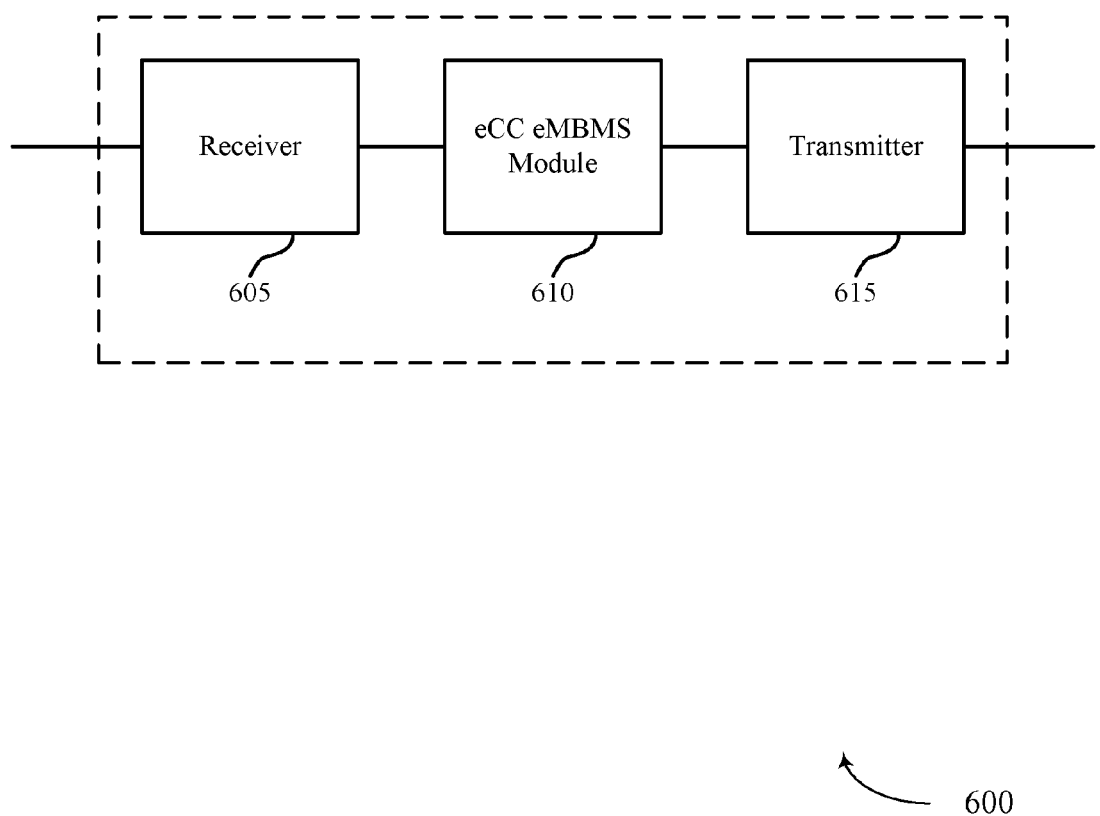
FIG. 6 shows a block diagram of a wireless device configured for eMBMS on eCCs in accordance with various aspects of the present disclosure.

FIG. 6 shows a block diagram of a wireless device 600 configured for eMBMS on eCCs in accordance with various aspects of the present disclosure. Wireless device 600 may be an example of aspects of a UE 115 described with reference to FIGS. 1-5. Wireless device 600 may include a receiver 605, an eCC eMBMS module 610, or a transmitter 615. Wireless device 600 may also include a processor. Each of these components may be in communication with one another.

The receiver 605 may receive information such as packets, user data, or control information associated with various information channels (e.g., control channels, unicast data channels, and information related to eMBMS on eCCs, etc.). Information may be passed on to the eCC eMBMS module 610, and to other components of wireless device 600. In some examples, the receiver 605 may receive the unicast data transmission during the subframe based on the control message.

The eCC eMBMS module 610 may determine that a set of resources is scheduled for an eMBMS, determine that a first symbol period of the set of resources is associated with a CRS preamble and a second symbol period of the set of resources is a unicast control symbol period, and identify a control message in the unicast control symbol period indicating a unicast data transmission utilizing the set of resources.

The transmitter 615 may transmit signals received from other components of wireless device 600. In some embodiments, the transmitter 615 may be collocated with the receiver 605 in a transceiver module. The transmitter 615 may include a single antenna, or it may include multiple antennas. In some examples, the transmitter 615 may transmit the unicast data transmission during the subframe.

Figure 7:
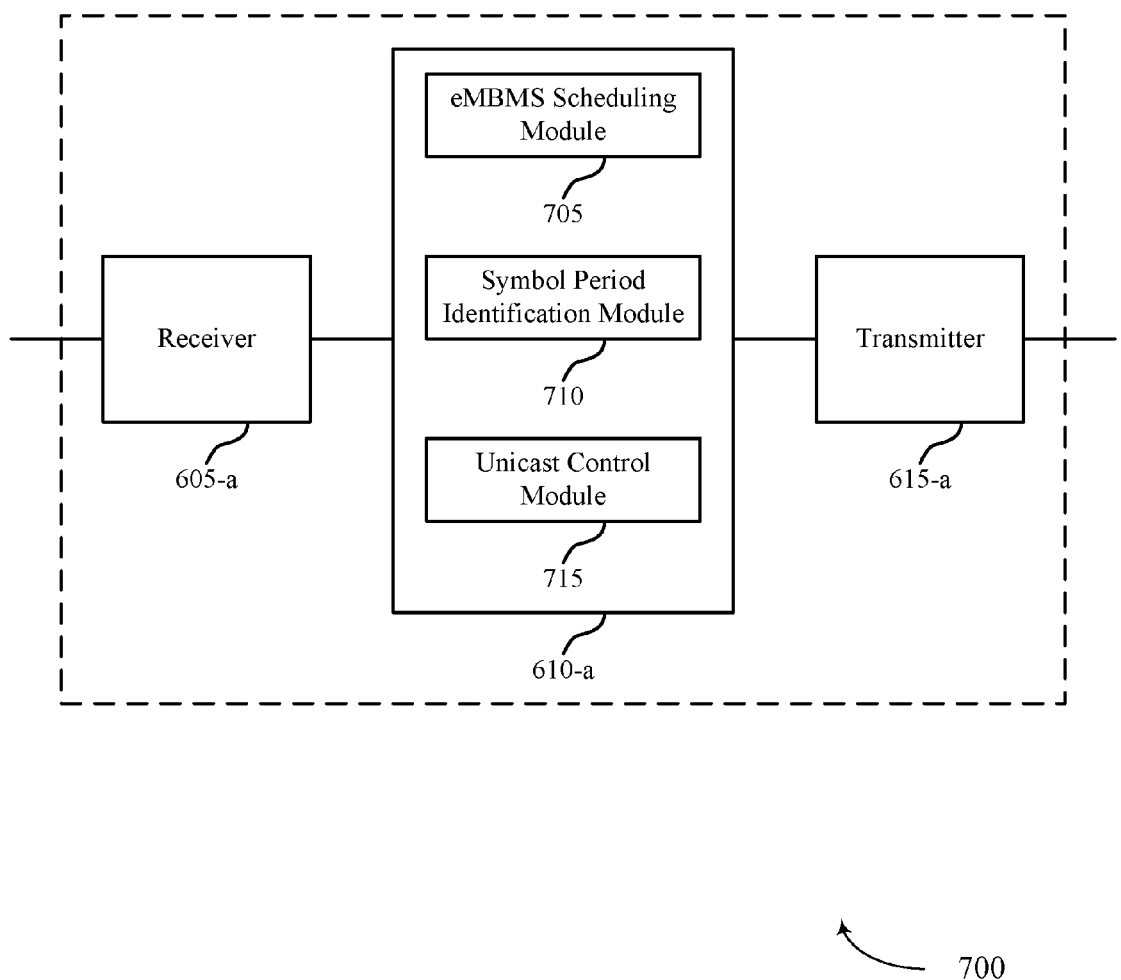
FIG. 7 shows a block diagram of a wireless device configured for eMBMS on eCCs in accordance with various aspects of the present disclosure.

FIG. 7 shows a block diagram of a wireless device 700 for eMBMS on eCCs in accordance with various aspects of the present disclosure. Wireless device 700 may be an example of aspects of a wireless device 600 or a UE 115 described with reference to FIGS. 1-6. Wireless device 700 may include a receiver 605-a, an eCC eMBMS module 610-a, or a transmitter 615-a. Wireless device 700 may also include a processor. Each of these components may be in communication with one another. The eCC eMBMS module 610-a may also include an eMBMS scheduling module 705, a symbol period identification module 710, and a unicast control module 715.

The receiver 605-a may receive information which may be passed on to eCC eMBMS module 610-a, and to other components of a UE 115. The eCC eMBMS module 610-a may perform the operations described above with reference to FIG. 6. The transmitter 615-a may transmit signals received from other components of wireless device 700.

The eMBMS scheduling module 705 may determine that a set of resources is scheduled for an eMBMS as described above with reference to FIGS. 2-5. The eMBMS scheduling module 705 may also determine that a second set of resources is scheduled for a second eMBMS. In some examples, determining that the set of resources may be scheduled for the eMBMS includes receiving a SIB indicating the eMBMS and receiving an MCCH based on the SIB.

The symbol period identification module 710 may determine that a first symbol period of the set of resources is associated with a CRS preamble and a second symbol period of the set of resources is a unicast control symbol period as described above with reference to FIGS. 2-5.

The unicast control module 715 may identify a control message in the unicast control symbol period indicating a unicast data transmission utilizing the set of resources as described above with reference to FIGS. 2-5. The unicast control module 715 may also receive the control message during the unicast control symbol period. The unicast control module 715 may also transmit the control message during the unicast control symbol period. In some examples, the control message may be a PUFICH transmission.

Figure 8:
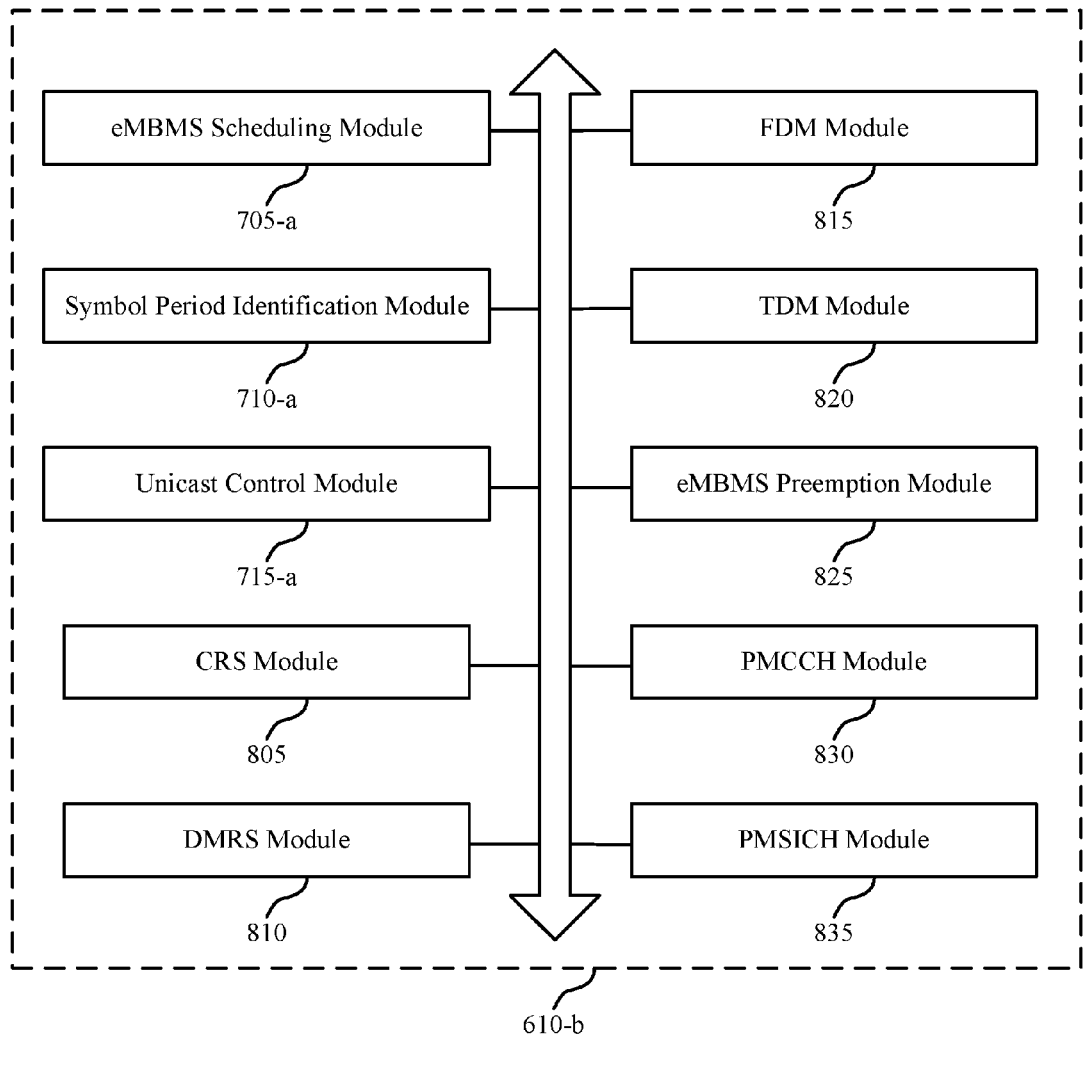
FIG. 8 shows a block diagram of an enhanced component carrier (eCC) eMBMS module configured for eMBMS on eCCs in accordance with various aspects of the present disclosure.

FIG. 8 shows a block diagram 800 of an eCC eMBMS module 610-b which may be a component of a wireless device 600 or a wireless device 700 for eMBMS on eCCs in accordance with various aspects of the present disclosure. The eCC eMBMS module 610-b may be an example of aspects of an eCC eMBMS module 610 described with reference to FIGS. 6-7. The eCC eMBMS module 610-b may include an eMBMS scheduling module 705-a, a symbol period identification module 710-a, and a unicast control module 715-a. Each of these modules may perform the functions described above with reference to FIG. 7. The eCC eMBMS module 610-b may also include a CRS module 805, a DMRS module 810, a FDM module 815, a TDM module 820, an eMBMS preemption module 825, a PMCCH module 830, and a PMSICH module 835.

The CRS module 805 may perform a CRS on/off detection for a subframe associated with the set of resources as described above with reference to FIGS. 2-5. The CRS module 805 may also receive a CRS during the subframe based on the CRS on/off detection. The CRS module 805 may also combine the CRS with accumulated CRS data based on the CRS on/off detection.

The DMRS module 810 may receive a DMRS during the subframe as described above with reference to FIGS. 2-5. In some examples, the DMRS utilizes one or several resource element associated with a CRS pattern. In some examples, the DMRS utilizes a low-density resource pattern for a set of non-CRS resource elements.

The FDM module 815 may determine that a first set of resources and a second set of resources are multiplexed according to an FDM configuration as described above with reference to FIGS. 2-5. The TDM module 820 may determine that a first set of resources and a second set of resources are multiplexed according to a TDM configuration as described above with reference to FIGS. 2-5.

The eMBMS preemption module 825 may receive an eMBMS preemption indication as described above with reference to FIGS. 2-5. In some examples, the eMBMS preemption module 825 may also determine that the set of resources scheduled for the eMBMS contains unicast data based on the preemption indication.

The PMCCH module 830 may receive a PMCCH transmission indicating a set of time and frequency resources for a PMCH as described above with reference to FIGS. 2-5.

The PMCCH module 830 may also receive a SIB indicating a set of resources for the PMCCH. Additionally or alternatively, the PMSICH module 835 may receive a PMSICH transmission indicating a set of time and frequency resources for an MTCH based on the PMCCH as described above with reference to FIGS. 2-5.

The components of wireless device 600, wireless device 700, or eCC eMBMS module 610-b may each, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
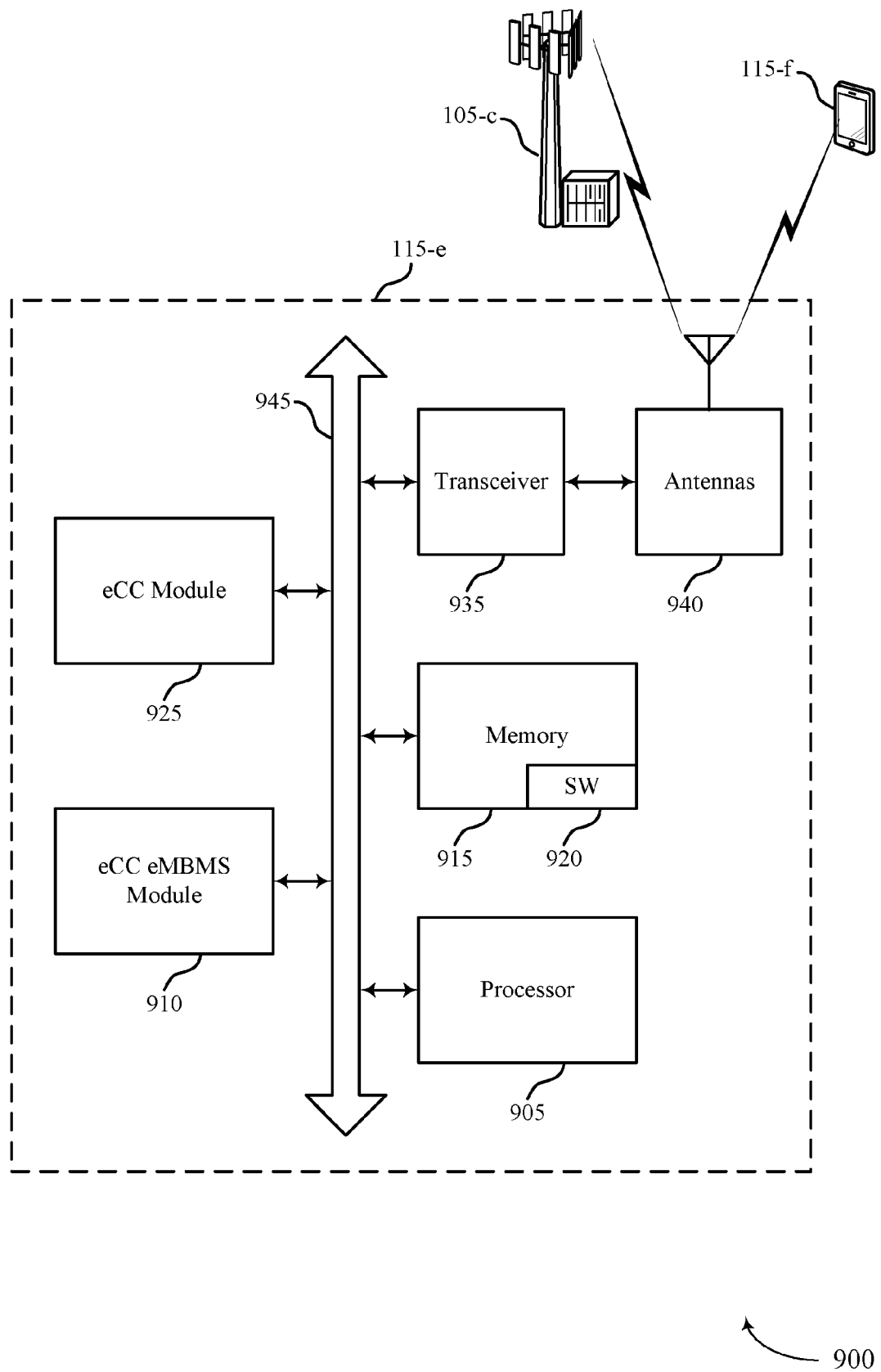
FIG. 9 illustrates a diagram of a system including a UE configured for eMBMS on eCCs in accordance with various aspects of the present disclosure.

FIG. 9 shows a diagram of a system 900 including a UE 115 configured for eMBMS on eCCs in accordance with various aspects of the present disclosure. System 900 may include UE 115-e, which may be an example of a wireless device 600, a wireless device 700, or a UE 115 described above with reference to FIGS. 1, 2 and 5-8. UE 115-e may include an eCC eMBMS module 910, which may be an example of an eCC eMBMS module 610 described with reference to FIGS. 6-8. UE 115-e may also include an eCC module 925. UE 115-e may also include components for bi-directional voice and data communications including components for transmitting communications and components for receiving communications. For example, UE 115-e may communicate bi-directionally with base station 105-c or UE 115-f.

The eCC module 925 may be configured such that the set of resources are based on a reduced symbol period, and the reduced symbol period may correspond to an eCC configuration as described above with reference to FIGS. 2-5. In some examples, the symbol period may be equal to a CCA length. The reduced symbol period may, in some cases, be based on an extended CP length. In some examples, the reduced symbol period based on the extended CP length corresponds to a bandwidth range associated with the eMBMS, and a second reduced symbol period based on a non-extended CP length corresponds to a bandwidth range associated with unicast transmission.

UE 115-*e* may also include a processor module 905, and memory 915 (including software (SW) 920), a transceiver module 935, and one or more antenna(s) 940, each of which may communicate, directly or indirectly, with one another (e.g., via one or more buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-*e* may include a single antenna 940, UE 115-*e* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to cause UE 115-*e* to perform various functions described herein (e.g., eMBMS on eCCs, etc.). Alternatively, the software/firmware code 920 may not be directly executable by the processor module 905 but cause UE 115-*e* (e.g., when compiled and executed) to perform functions described herein. The processor module 905 may include an intelligent hardware device, (e.g., a central processing unit (CPU), a microcontroller, an ASIC, etc.)

Figure 10:
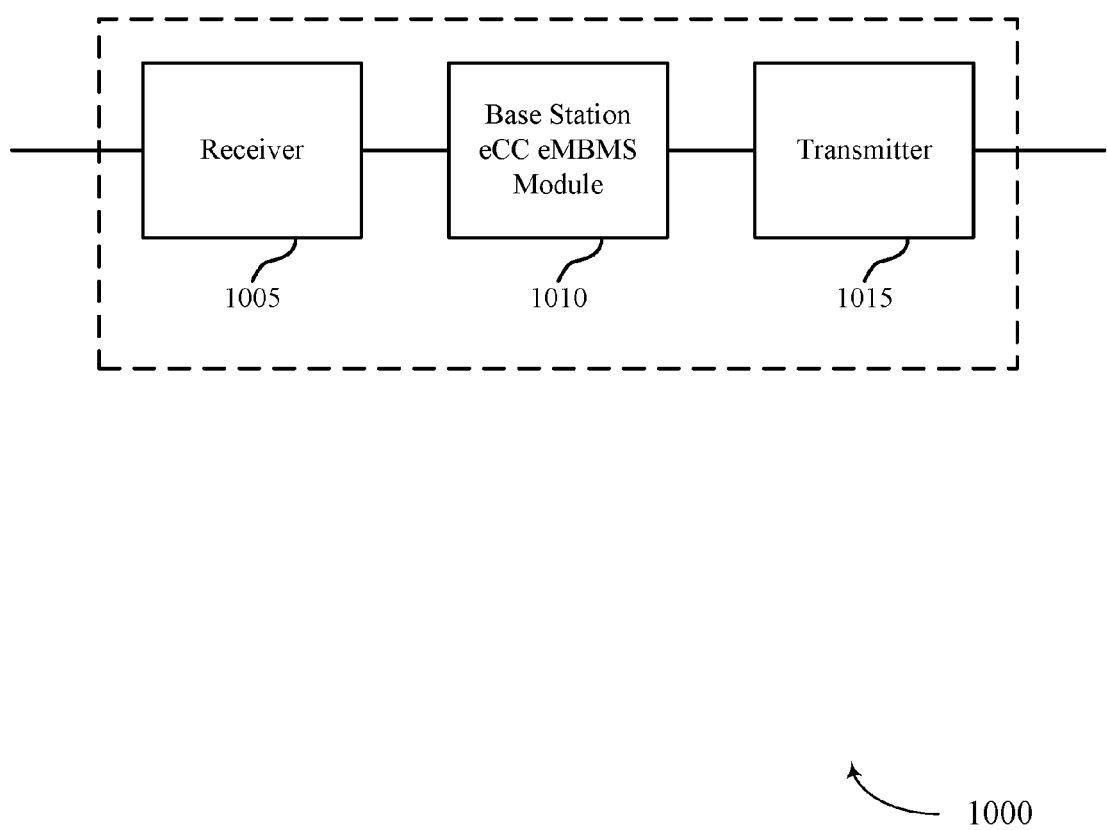
FIG. 10 shows a block diagram of a wireless device configured for eMBMS on eCCs in accordance with various aspects of the present disclosure.

FIG. 10 shows a block diagram of a wireless device 1000 configured for eMBMS on eCCs in accordance with various aspects of the present disclosure. Wireless device 1000 may be an example of aspects of a base station 105 described with reference to FIGS. 1-5. Wireless device 1000 may include a receiver 1005, a base station (BS) eCC eMBMS module 1010, or a transmitter 1015. Wireless device 1000 may also include a processor. Each of these components may be in communication with one another.

The receiver 1005 may receive information such as packets, user data, or control information associated with various information channels (e.g., control channels, UL data channels, and information related to eMBMS on eCCs, etc.). Information may be passed on to the base station eCC eMBMS module 1010, and to other components of wireless device 1000.

The base station eCC eMBMS module 1010 may determine that a bandwidth range of an eCC is scheduled for eMBMS, select an extended CP length for the bandwidth range based on the determination, and select a reference signal configuration based on the extended CP length. The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
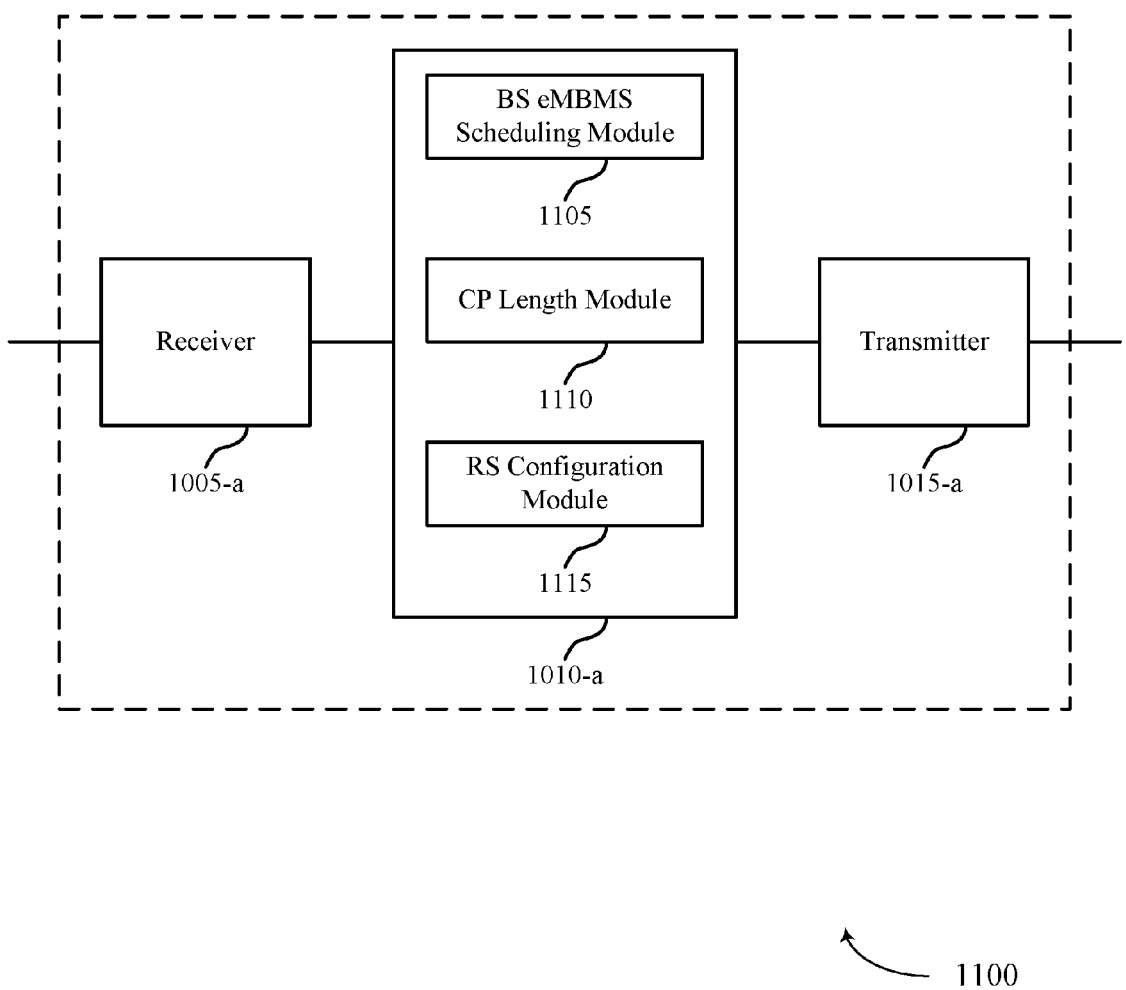
FIG. 11 shows a block diagram of a wireless device configured for eMBMS on eCCs in accordance with various aspects of the present disclosure.

FIG. 11 shows a block diagram of a wireless device 1100 for eMBMS on eCCs in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station eCC eMBMS module 1010-*a*, or a transmitter 1015-*a*. Wireless device 1100 may also include a processor. Each of these components may be in communication with one another. The base station eCC eMBMS module 1010-*a* may also include a BS eMBMS scheduling module 1105, a CP length module 1110, and a RS configuration module 1115.

The receiver 1005-*a* may receive information which may be passed on to base station eCC eMBMS module 1010-*a*, and to other components of a base station 105. The base station eCC eMBMS module 1010-*a* may perform the operations described above with reference to FIG. 10. The transmitter 1015-*a* may transmit signals received from other components of wireless device 1100.

The BS eMBMS scheduling module 1105 may determine that a bandwidth range of an eCC is scheduled for eMBMS as described above with reference to FIGS. 2-5. The CP length module 1110 may select an extended CP length for the bandwidth range based on the determination that the bandwidth range of the eCC is scheduled for eMBMS as described above with reference to FIGS. 2-5. In some examples, the RS configuration module 1115 may select a reference signal configuration based on the extended CP length as described above with reference to FIGS. 2-5.

Figure 12:
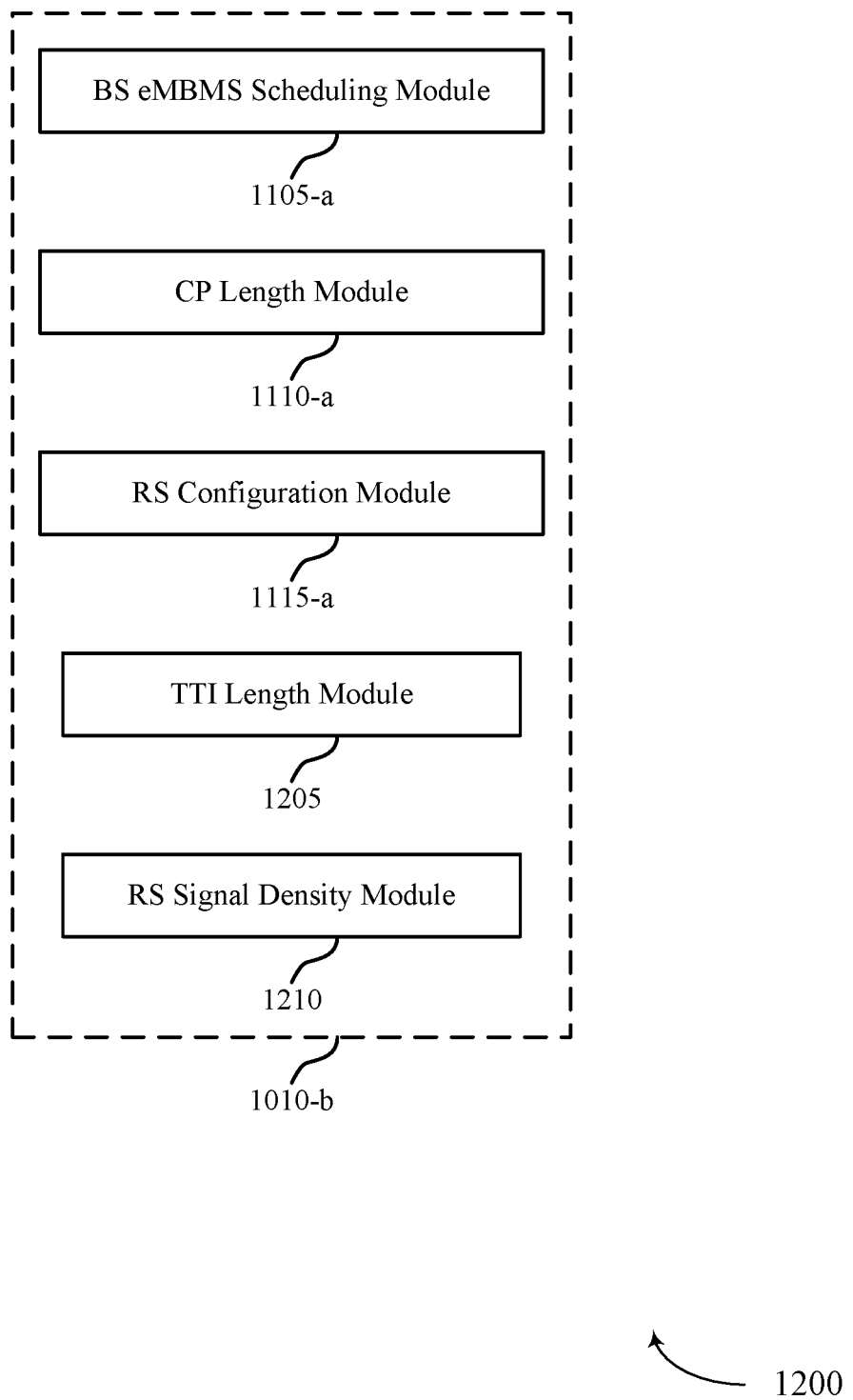
FIG. 12 shows a block diagram of a base station eCC eMBMS module configured for eMBMS on eCCs in accordance with various aspects of the present disclosure.

FIG. 12 shows a block diagram 1200 of a base station eCC eMBMS module 1010-*b* which may be a component of a wireless device 1000 or a wireless device 1100 for eMBMS on eCCs in accordance with various aspects of the present disclosure. The base station eCC eMBMS module 1010-*b* may be an example of aspects of a base station eCC eMBMS module 1010 described with reference to FIGS. 10-11. The base station eCC eMBMS module 1010-*b* may include a BS eMBMS scheduling module 1105-*a*, a CP length module 1110-*a*, and a RS configuration module 1115-*a*. Each of these modules may perform the functions described above with reference to FIG. 11. The base station eCC eMBMS module 1010-*b* may also include a TTI length module 1205, and a RS signal density module 1210.

The TTI length module 1205 may be configured such that the reference signal configuration may include a minimum TTI length as described above with reference to FIGS. 2-5. Additionally or alternatively, the RS signal density module 1210 may be configured such that the reference signal configuration may include an increased reference signal density as described above with reference to FIGS. 2-5.

The components of the wireless device 1000, wireless device 1100, or base station eCC eMBMS module 1010-*b* may each, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
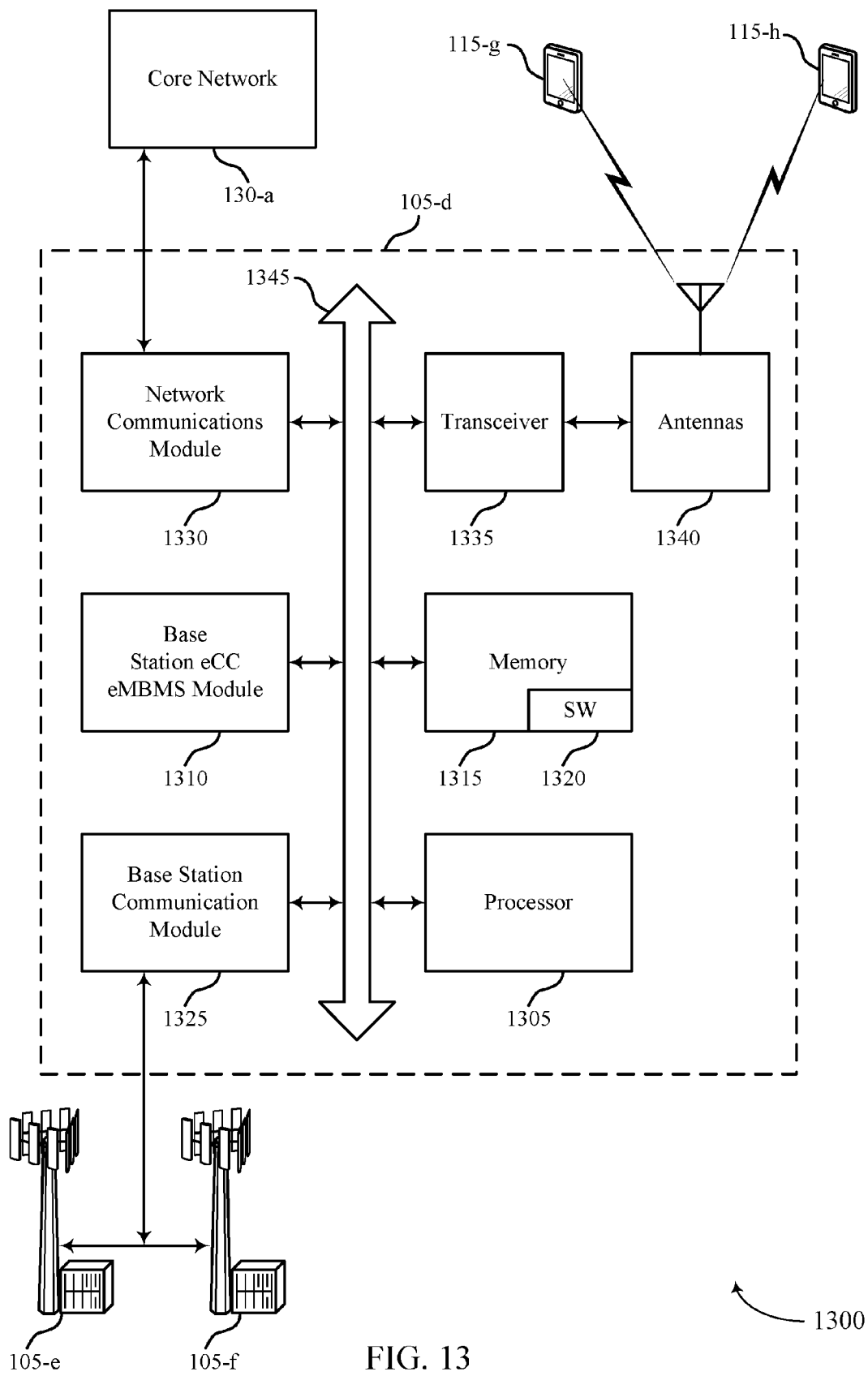
FIG. 13 illustrates a diagram of a system including a base station configured for eMBMS on eCCs in accordance with various aspects of the present disclosure.

FIG. 13 shows a diagram of a system 1300 including a base station 105 configured for eMBMS on eCCs in accordance with various aspects of the present disclosure. System 1300 may include base station 105-*d*, which may be an example of a wireless device 1000, a wireless device 1100, or a base station 105 described above with reference to FIGS. 1-5, and 10-12. Base station 105-*d* may include a base station eCC eMBMS module 1310, which may be an example of a base station eCC eMBMS module 1010 described with reference to FIGS. 10-12. Base station 105-*d* may also include components for bi-directional voice and data communications including components for transmitting communications and components for receiving communications. For example, base station 105-*d* may communicate bi-directionally with UE 115-*g* or UE 115-*h*.

In some cases, base station 105-*d* may have one or more wired backhaul links. Base station 105-*d* may have a wired backhaul link (e.g., S1 interface, etc.) to the core network 130-*a*. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1325. In some examples, base station communication module 1325 may provide an X2 interface within an LTE/LTE-A wireless communication network technology to provide communication between some of the base stations 105. In some examples, base station 105-*d* may communicate with other base stations through core network 130. The base station 105-*d* may communicate with the core network 130 through network communications module 1330.

The base station 105-*d* may include a processor module 1305, memory 1315 (including software (SW) 1320), transceiver modules 1335, and antenna(s) 1340, which each may be in communication, directly or indirectly, with one another (e.g., over bus system 1345). The transceiver modules 1335 may be configured to communicate bi-directionally, via the antenna(s) 1340, with the UEs 115, which may be multi-mode devices. The transceiver module 1335 (or other components of the base station 105-*d*) may also be configured to communicate bi-directionally, via the antennas 1340, with one or more other base stations (not shown). The transceiver module 1335 may include a modem configured to modulate the packets and provide the modulated packets to the antennas 1340 for transmission, and to demodulate packets received from the antennas 1340. The base station 105-*d* may include multiple transceiver modules 1335, each with one or more associated antennas 1340. The transceiver module may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor module 1310 to cause base station 105-*d* to perform various functions described herein (e.g., eMBMS on eCCs, selecting coverage enhancement techniques, call processing, database management, message routing, etc.). Alternatively, the software 1320 may not be directly executable by the processor module 1305 but be configured to cause the base station 105-*d* (e.g., when compiled and executed) to perform functions described herein. The processor module 1305 may include an intelligent hardware device (e.g., a CPU, a microcontroller, an ASIC, etc.). The processor module 1305 may include various special purpose processors such as encoders, queue processing modules, base band processors, radio head controllers, digital signal processor (DSPs), and the like.

The base station communications module 1325 may manage communications with other base stations 105. The communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

Figure 14:
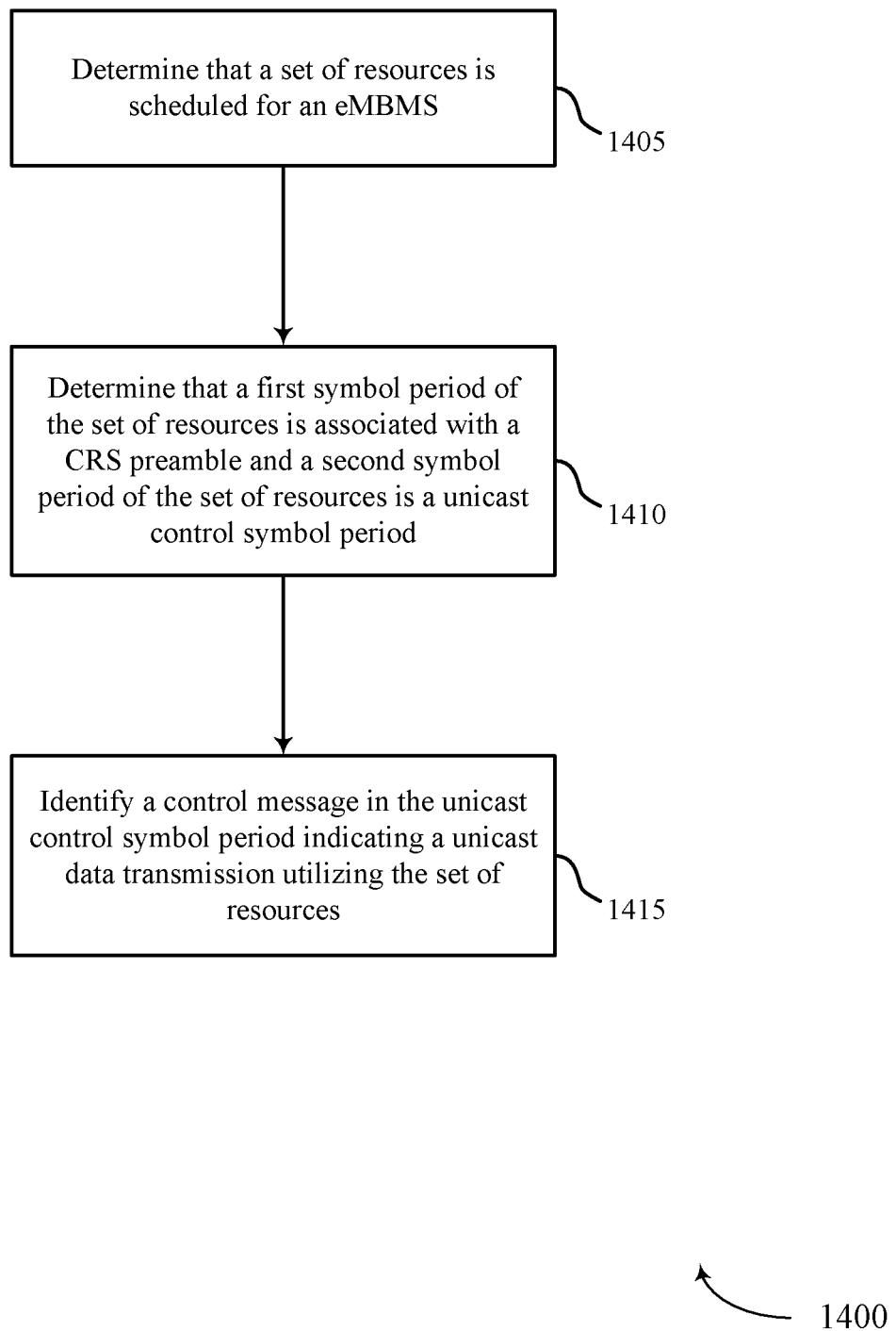
FIG. 14 shows a flowchart illustrating a method for eMBMS on eCCs in accordance with various aspects of the present disclosure.

FIG. 14 shows a flowchart illustrating a method 1400 for eMBMS on eCCs in accordance with various aspects of the present disclosure. The operations of method 1400 may be implemented by a UE 115 or its components as described with reference to FIGS. 1-9. For example, the operations of method 1400 may be performed by the eCC eMBMS module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may determine that a set of resources is scheduled for an eMBMS as described above with reference to FIGS. 2-5. In certain examples, the operations of block 1405 may be performed by the eMBMS scheduling module 705 as described above with reference to FIG. 7.

At block 1410, the UE 115 may determine that a first symbol period of the set of resources is associated with a CRS preamble and a second symbol period of the set of resources is a unicast control symbol period as described above with reference to FIGS. 2-5. In certain examples, the operations of block 1410 may be performed by the symbol period identification module 710 as described above with reference to FIG. 7.

At block 1415, the UE 115 may identify a control message in the unicast control symbol period indicating a unicast data transmission utilizing the set of resources as described above with reference to FIGS. 2-5. In certain examples, the operations of block 1415 may be performed by the unicast control module 715 as described above with reference to FIG. 7.

Figure 15:
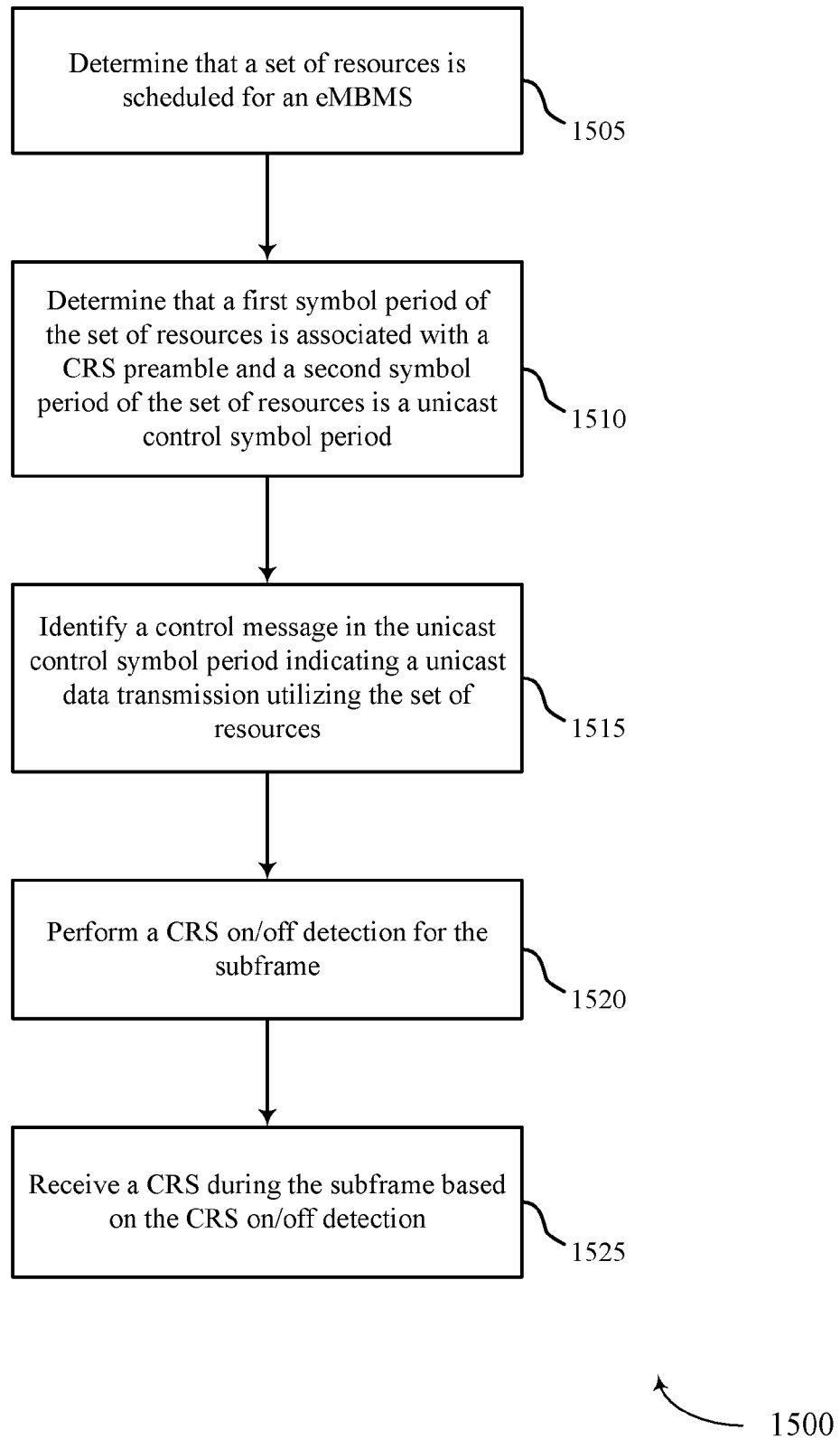
FIG. 15 shows a flowchart illustrating a method for eMBMS on eCCs in accordance with various aspects of the present disclosure.

FIG. 15 shows a flowchart illustrating a method 1500 for eMBMS on eCCs in accordance with various aspects of the present disclosure. The operations of method 1500 may be implemented by a UE 115 or its components as described with reference to FIGS. 1-9. For example, the operations of method 1500 may be performed by the eCC eMBMS module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may determine that a set of resources is scheduled for an eMBMS as described above with reference to FIGS. 2-5. In certain examples, the operations of block 1505 may be performed by the eMBMS scheduling module 705 as described above with reference to FIG. 7.

At block 1510, the UE 115 may determine that a first symbol period of the set of resources is associated with a CRS preamble and a second symbol period of the set of resources is a unicast control symbol period as described above with reference to FIGS. 2-5. In certain examples, the operations of block 1510 may be performed by the symbol period identification module 710 as described above with reference to FIG. 7.

At block 1515, the UE 115 may identify a control message in the unicast control symbol period indicating a unicast data transmission utilizing the set of resources as described above with reference to FIGS. 2-5. In certain examples, the operations of block 1515 may be performed by the unicast control module 715 as described above with reference to FIG. 7.

At block 1520, the UE 115 may perform a CRS on/off detection for a subframe associated with the set of resources as described above with reference to FIGS. 2-5. In certain examples, the operations of block 1520 may be performed by the CRS module 805 as described above with reference to FIG. 8.

At block 1525, the UE 115 may receive at least one CRS during the subframe based on the CRS on/off detection as described above with reference to FIGS. 2-5. In certain examples, the operations of block 1525 may be performed by the CRS module 805 as described above with reference to FIG. 8.

Figure 16:
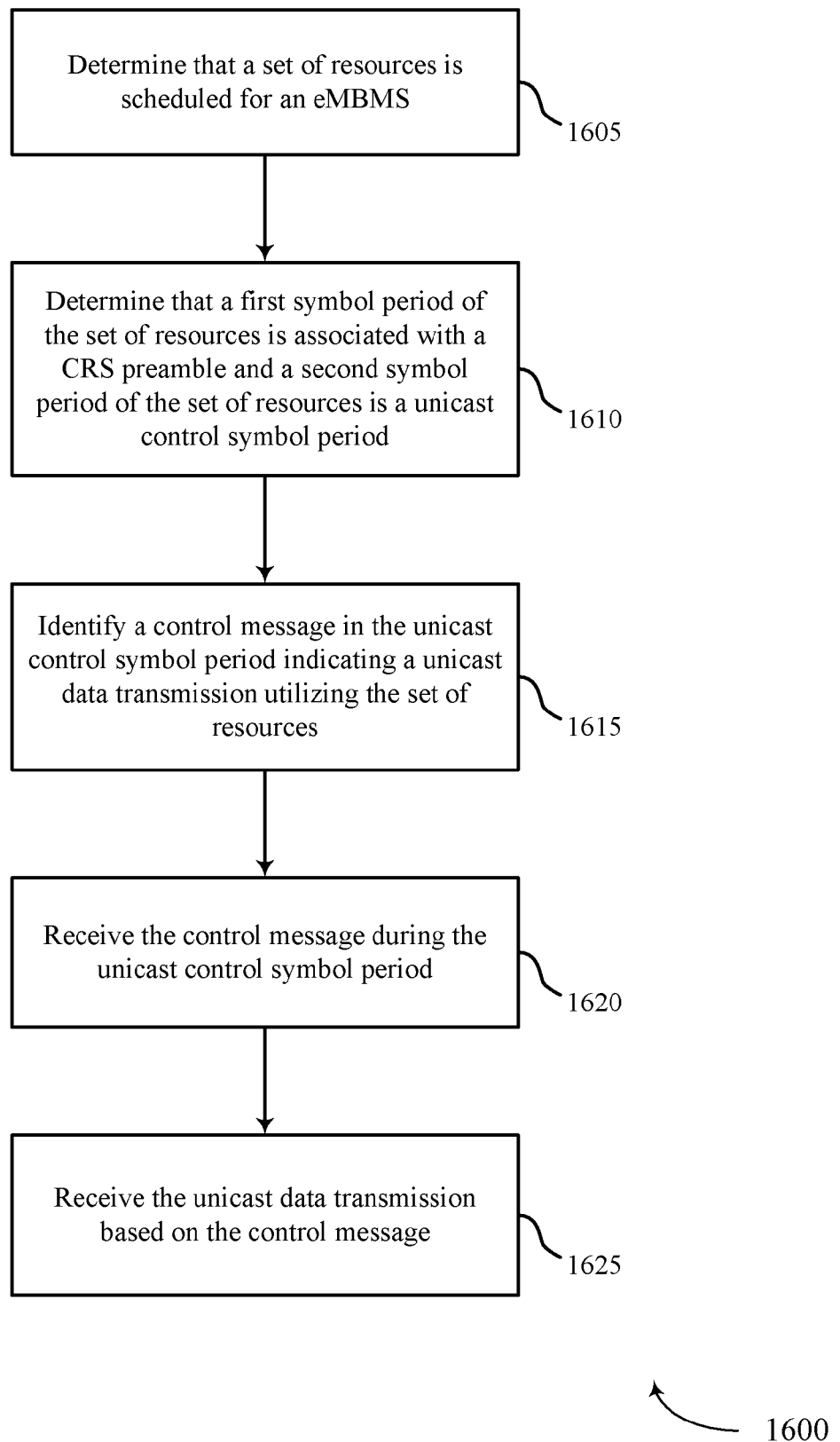
FIG. 16 shows a flowchart illustrating a method for eMBMS on eCCs in accordance with various aspects of the present disclosure.

FIG. 16 shows a flowchart illustrating a method 1600 for eMBMS on eCCs in accordance with various aspects of the present disclosure. The operations of method 1600 may be implemented by a UE 115 or its components as described with reference to FIGS. 1-9. For example, the operations of method 1600 may be performed by the eCC eMBMS module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400 and 1500 of FIGS. 14 and 15.

At block 1605, the UE 115 may determine that a set of resources is scheduled for an eMBMS as described above with reference to FIGS. 2-5. In certain examples, the operations of block 1605 may be performed by the eMBMS scheduling module 705 as described above with reference to FIG. 7.

At block 1610, the UE 115 may determine that a first symbol period of the set of resources is associated with a CRS preamble and a second symbol period of the set of resources is a unicast control symbol period as described above with reference to FIGS. 2-5. In certain examples, the operations of block 1610 may be performed by the symbol period identification module 710 as described above with reference to FIG. 7.

At block 1615, the UE 115 may identify a control message in the unicast control symbol period indicating a unicast data transmission utilizing the set of resources as described above with reference to FIGS. 2-5. In certain examples, the operations of block 1615 may be performed by the unicast control module 715 as described above with reference to FIG. 7.

At block 1620, the UE 115 may receive the control message during the unicast control symbol period as described above with reference to FIGS. 2-5. In certain examples, the operations of block 1620 may be performed by the unicast control module 715 as described above with reference to FIG. 7.

At block 1625, the UE 115 may receive the unicast data transmission during the subframe based on the control message as described above with reference to FIGS. 2-5. In certain examples, the operations of block 1625 may be performed by the receiver 605 as described above with reference to FIG. 6.

Figure 17:
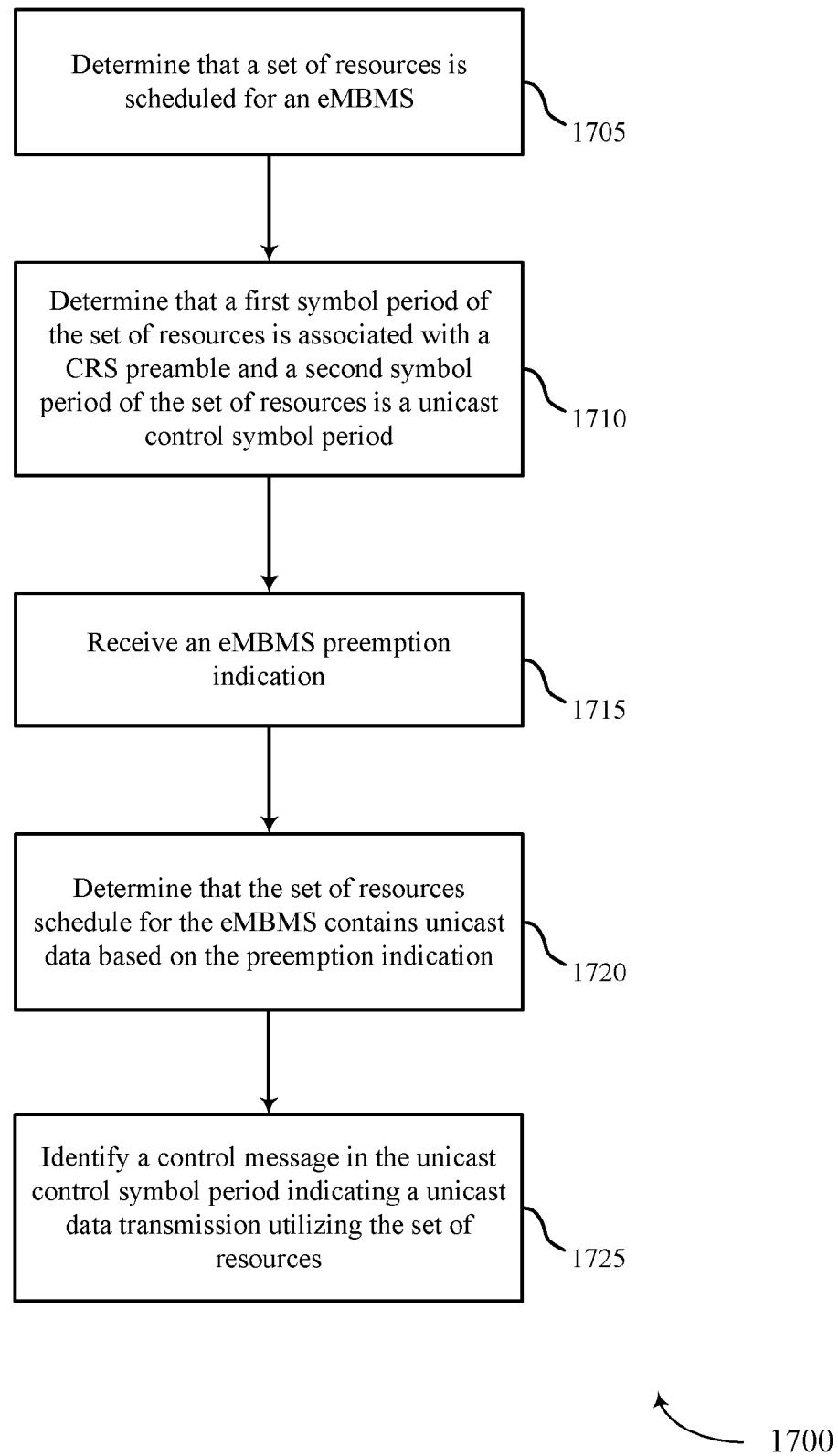
FIG. 17 shows a flowchart illustrating a method for eMBMS on eCCs in accordance with various aspects of the present disclosure.

FIG. 17 shows a flowchart illustrating a method 1700 for eMBMS on eCCs in accordance with various aspects of the present disclosure. The operations of method 1700 may be implemented by a UE 115 or its components as described with reference to FIGS. 1-9. For example, the operations of method 1700 may be performed by the eCC eMBMS module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, and 1600 of FIGS. 14-16.

At block 1705, the UE 115 may determine that a set of resources is scheduled for an eMBMS as described above with reference to FIGS. 2-5. In certain examples, the operations of block 1705 may be performed by the eMBMS scheduling module 705 as described above with reference to FIG. 7.

At block 1710, the UE 115 may determine that a first symbol period of the set of resources is associated with a CRS preamble and a second symbol period of the set of resources is a unicast control symbol period as described above with reference to FIGS. 2-5. In certain examples, the operations of block 1710 may be performed by the symbol period identification module 710 as described above with reference to FIG. 7.

At block 1715, the UE 115 may receive an eMBMS preemption indication as described above with reference to FIGS. 2-5. In certain examples, the operations of block 1715 may be performed by the eMBMS preemption module 825 as described above with reference to FIG. 8.

At block 1720, the UE 115 may determine that the set of resources scheduled for the eMBMS contains unicast data based on the preemption indication as described above with reference to FIGS. 2-5. In certain examples, the operations of block 1720 may be performed by the eMBMS preemption module 825 as described above with reference to FIG. 8.

At block 1725, the UE 115 may identify a control message in the unicast control symbol period indicating a unicast data transmission utilizing the set of resources as described above with reference to FIGS. 2-5. In certain examples, the operations of block 1725 may be performed by the unicast control module 715 as described above with reference to FIG. 7.

Figure 18:
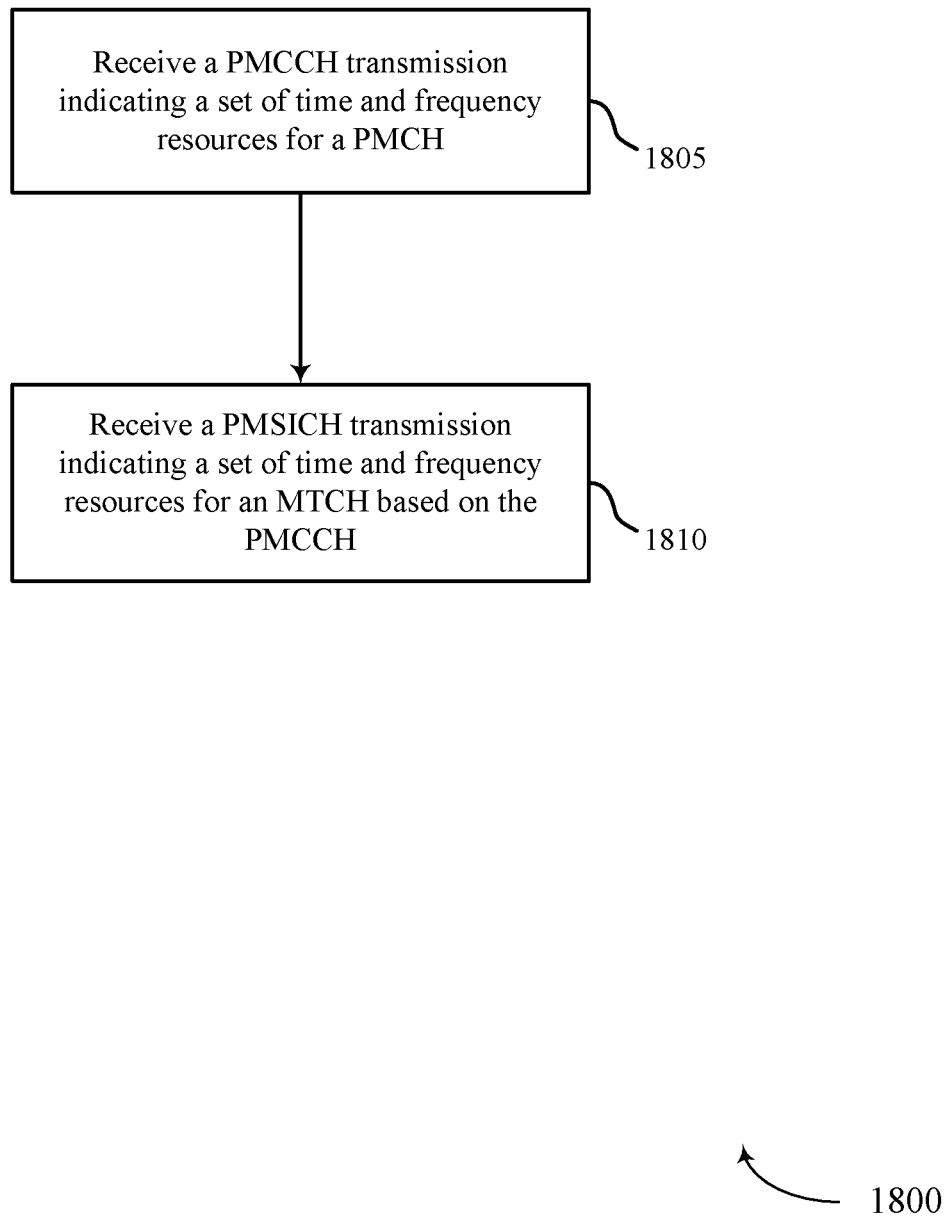
FIG. 18 shows a flowchart illustrating a method for eMBMS on eCCs in accordance with various aspects of the present disclosure.

FIG. 18 shows a flowchart illustrating a method 1800 for eMBMS on eCCs in accordance with various aspects of the present disclosure. The operations of method 1800 may be implemented by a UE 115 or its components as described with reference to FIGS. 1-9. For example, the operations of method 1800 may be performed by the eCC eMBMS module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1805, the UE 115 may receive a PMCCH transmission indicating a set of time and frequency resources for a PMCH as described above with reference to FIGS. 2-5. In certain examples, the operations of block 1805 may be performed by the PMCCH module 830 as described above with reference to FIG. 8.

At block 1810, the UE 115 may receive a PMSICH transmission indicating a set of time and frequency resources for an MTCH based at least in part on the PMCCH as described above with reference to FIGS. 2-5. In certain examples, the operations of block 1810 may be performed by the PMSICH module 835 as described above with reference to FIG. 8.

Figure 19:
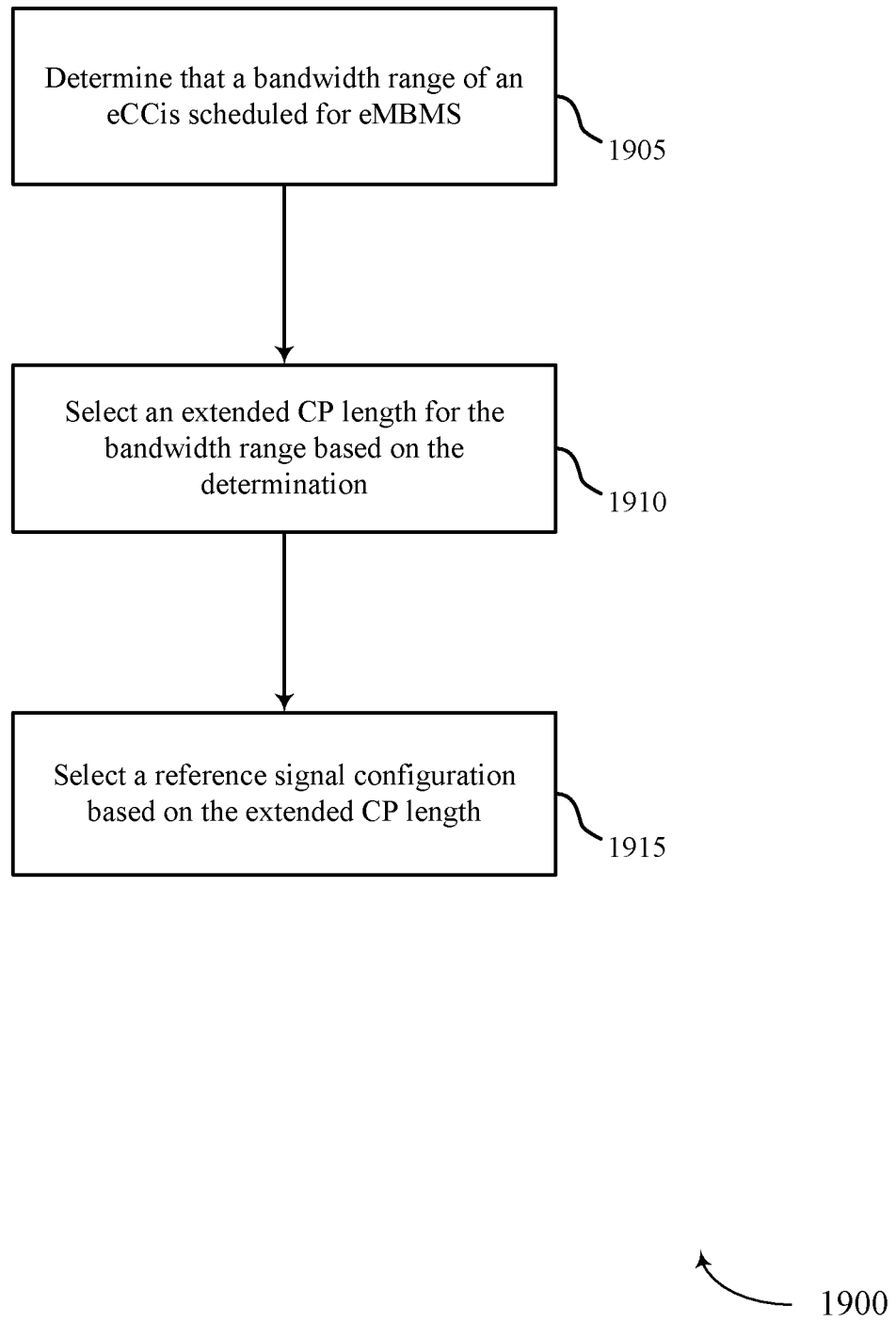
FIG. 19 shows a flowchart illustrating a method for eMBMS on eCCs in accordance with various aspects of the present disclosure.

FIG. 19 shows a flowchart illustrating a method 1900 for eMBMS on eCCs in accordance with various aspects of the present disclosure. The operations of method 1900 may be implemented by a base station 105 or its components as described with reference to FIGS. 1-5, and 10-13. For example, the operations of method 1900 may be performed by the base station eCC eMBMS module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 1905, the base station 105 may determine that a bandwidth range of an eCC is scheduled for eMBMS as described above with reference to FIGS. 2-5. In certain examples, the operations of block 1905 may be performed by the BS eMBMS scheduling module 1105 as described above with reference to FIG. 11.

At block 1910, the base station 105 may select an extended CP length for the bandwidth range based at least in part on the determination as described above with reference to FIGS. 2-5. In certain examples, the operations of block 1910 may be performed by the CP length module 1110 as described above with reference to FIG. 11.

At block 1915, the base station 105 may select a reference signal configuration based at least in part on the extended CP length as described above with reference to FIGS. 2-5. In certain examples, the operations of block 1915 may be performed by the RS configuration module 1115 as described above with reference to FIG. 11.

Thus, methods 1400, 1500, 1600, 1700, 1800, and 1900 may provide for eMBMS on eCCs. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
   determining that a set of resources is scheduled for an evolved multimedia broadcast multicast service (eMBMS);
   determining that a first symbol period of the set of resources is associated with a cell-specific reference signal (CRS) preamble and a second symbol period of the set of resources is a unicast control symbol period;
   identifying a control message in the unicast control symbol period indicating a unicast data transmission utilizing the set of resources;
   performing a CRS on/off detection for a subframe associated with the set of resources;
   receiving at least one CRS during the subframe based at least in part on the CRS on/off detection; and
   combining the at least one CRS with accumulated CRS data based at least in part on the CRS on/off detection.

2. The method of claim 1, further comprising:
   receiving at least one demodulation reference signal (DMRS) during the subframe associated with the set of resources.

3. The method of claim 2, wherein the at least one DMRS utilizes at least one resource element associated with a CRS pattern.

4. The method of claim 3, wherein the at least one DMRS utilizes a low-density resource pattern for a set of non-CRS resource elements.

5. The method of claim 1, further comprising:
   receiving the control message during the unicast control symbol period; and
   receiving the unicast data transmission during the subframe associated with the set of resources based at least in part on the control message.

6. The method of claim 1, further comprising:
   transmitting the control message during the unicast control symbol period; and
   transmitting the unicast data transmission during the subframe associated with the set of resources.

7. The method of claim 1, further comprising:
   determining that a second set of resources is scheduled for a second eMBMS.

8. The method of claim 7, further comprising:
   determining that the set of resources and the second set of resources are multiplexed according to a frequency division multiplexing (FDM) configuration.

9. The method of claim 7, further comprising:
   determining that the set of resources and the second set of resources are multiplexed according to a time division multiplexing (TDM) configuration.

10. The method of claim 1, further comprising:
    receiving an eMBMS preemption indication; and
    determining that the set of resources scheduled for the eMBMS contains unicast data based at least in part on the eMBMS preemption indication.

11. The method of claim 1, wherein the set of resources are based at least in part on a reduced symbol period, wherein the reduced symbol period corresponds to an enhanced component carrier (eCC) configuration.

12. The method of claim 11, wherein the reduced symbol period is equal to a clear channel assessment (CCA) length.

13. The method of claim 11, wherein the reduced symbol period is based at least in part on an extended cyclic prefix (CP) length.

14. The method of claim 13, wherein the reduced symbol period based at least in part on the extended CP length corresponds to a bandwidth range associated with the eMBMS and a second reduced symbol period based at least in part on a non-extended CP length corresponds to a bandwidth range associated with unicast transmission.

15. The method of claim 1, wherein the control message uses a physical uplink format indicator channel (PUFICH) format or resource assignment.

16. The method of claim 1, wherein determining that the set of resources is scheduled for the eMBMS comprises:
    receiving a system information block (SIB) indicating the eMBMS and receiving a multicast control channel (MCCH) based at least in part on the SIB.

17. An apparatus for communication at a wireless device, comprising:
    means for determining that a set of resources is scheduled for an evolved multimedia broadcast multicast service (eMBMS);
    means for determining that a first symbol period of the set of resources is associated with a cell-specific reference signals (CRS) preamble and a second symbol period of the set of resources is a unicast control symbol period;

means for identifying a control message in the unicast control symbol period indicating a unicast data transmission utilizing the set of resources;

means for performing a CRS on/off detection for a subframe associated with the set of resources;

means for receiving at least one CRS during the subframe based at least in part on the CRS on/off detection; and means for combining the at least one CRS with accumulated CRS data based at least in part on the CRS on/off detection.

18. An apparatus for communication at a wireless device, comprising:

a processor;

memory in electronic communication with the processor; and instructions stored in the memory; wherein the instructions are executable by the processor to cause the apparatus to:

determine that a set of resources is scheduled for an evolved multimedia broadcast multicast service (eMBMS);

determine that a first symbol period of the set of resources is associated with a cell-specific reference signals (CRS) preamble and a second symbol period of the set of resources is a unicast control symbol period;

identify a control message in the unicast control symbol period indicating a unicast data transmission utilizing the set of resources;

perform a CRS on/off detection for a subframe associated with the set of resources;

receive at least one CRS during the subframe based at least in part on the CRS on/off detection; and combine the at least one CRS with accumulated CRS data based at least in part on the CRS on/off detection.

19. The apparatus of claim 18, wherein the instructions are executable by the processor to cause the apparatus to:

receive at least one demodulation reference signal (DMRS) during the subframe associated with the set of resources.

20. The apparatus of claim 19, wherein the at least one DMRS utilizes at least one resource element associated with a CRS pattern and a low-density resource pattern for a set of non-CRS resource elements.

21. The apparatus of claim 18, wherein the instructions are executable by the processor to cause the apparatus to:

receive the control message during the unicast control symbol period; and receive the unicast data transmission during the subframe associated with the set of resources based at least in part on the control message.

22. The apparatus of claim 18, wherein the instructions are executable by the processor to cause the apparatus to:

transmit the control message during the unicast control symbol period; and transmit the unicast data transmission during the subframe associated with the set of resources.

23. The apparatus of claim 18, wherein the instructions are executable by the processor to:

determine that a second set of resources is scheduled for a second eMBMS.

24. The apparatus of claim 23, wherein the instructions are executable by the processor to cause the apparatus to:

determine that the set of resources and the second set of resources are multiplexed according to a frequency division multiplexing (FDM) configuration.

25. The apparatus of claim 23, wherein the instructions are executable by the processor to cause the apparatus to:

determine that the set of resources and the second set of resources are multiplexed according to a time division multiplexing (TDM) configuration.

26. A non-transitory computer-readable medium storing code for communication at a wireless device, the code comprising instructions executable to:

determine that a set of resources is scheduled for an evolved multimedia broadcast multicast service (eMBMS);

determine that a first symbol period of the set of resources is associated with a cell-specific reference signals (CRS) preamble and a second symbol period of the set of resources is a unicast control symbol period;

identify a control message in the unicast control symbol period indicating a unicast data transmission utilizing the set of resources;

perform a CRS on/off detection for a subframe associated with the set of resources;

receive at least one CRS during the subframe based at least in part on the CRS on/off detection; and combine the at least one CRS with accumulated CRS data based at least in part on the CRS on/off detection.

* * * * *